(12) United States Patent
Parsons et al.

(10) Patent No.: US 8,496,025 B2
(45) Date of Patent: Jul. 30, 2013

(54) ELECTRONIC FAUCETS FOR LONG-TERM OPERATION

(75) Inventors: Natan E. Parsons, Brookline, MA (US); Fatih Guler, Winchester, MA (US); Kay Herbert, Winthrop, MA (US); Xiaoxiong Mo, Lexington, MA (US); Gregory P. Greene, Waltham, MA (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 12/798,492

(22) Filed: Apr. 5, 2010

(65) Prior Publication Data

US 2010/0269923 A1      Oct. 28, 2010

Related U.S. Application Data

(63) Continuation of application No. 11/480,780, filed on Jul. 3, 2006, now Pat. No. 7,690,623, which is a continuation of application No. 10/860,938, filed on Jun. 3, 2004, now Pat. No. 7,069,941, which is a continuation of application No. PCT/US02/38757, filed on Dec. 4, 2002, which is a continuation-in-part of application No. 10/011,423, filed on Dec. 4, 2001, now Pat. No. 6,619,320.

(60) Provisional application No. 60/391,282, filed on Jun. 24, 2002.

(51) Int. Cl.
*E03C 1/02* (2006.01)
*F16K 31/02* (2006.01)

(52) U.S. Cl.
USPC ............... 137/624.11; 137/801; 251/129.04; 4/623

(58) Field of Classification Search
USPC ............... 137/801, 624.11; 251/30.02–30.04, 251/129.04, 129.15; 4/623
See application file for complete search history.

(56) References Cited

U.S. PATENT DOCUMENTS

| | | | |
|---|---|---|---|
| 2,438,207 A | 3/1948 | Derby | 4/304 |
| 2,507,966 A | 5/1950 | Filliung | 4/303 |
| 2,603,794 A | 7/1952 | Bokser | 4/304 |
| 2,619,986 A | 12/1952 | Goepfrich et al. | 251/129.17 |
| 2,842,400 A | 7/1958 | Booth et al. | 239/569 |
| 3,022,450 A | 2/1962 | Chase Jr. | 361/194 |
| 3,098,635 A | 7/1963 | Delaporte et al. | 251/54 |
| 3,151,340 A | 10/1964 | Teshima | 251/129.04 |
| 3,314,081 A | 4/1967 | Atkins et al. | 4/304 |
| 3,369,205 A | 2/1968 | Hamrick | 335/177 |
| 3,379,214 A | 4/1968 | Weinberg | 137/625.5 |
| 3,406,941 A | 10/1968 | Ichimori et al. | 251/129.01 |

(Continued)

FOREIGN PATENT DOCUMENTS

| | | |
|---|---|---|
| EP | 8048193 | 6/1998 |
| GB | 1532210 | 11/1978 |
| WO | WO 97/04262 | 2/1997 |
| WO | WO 01/20204 | 3/2001 |

*Primary Examiner* — Kevin Lee
(74) *Attorney, Agent, or Firm* — Ivan David Zitkovsky

(57) ABSTRACT

An electronic faucet (10) mounted on a countertop (12) includes a housing, at least one fluid inlet line (24a, 24b) extending into the housing, a fluid outlet (46) from the housing, a solenoid (142, 143) for operating a valve controlling the fluid flow between at least one inlet line and the outlet, and a control circuit (206) for controlling the opening and closing of the valve.

25 Claims, 23 Drawing Sheets

U.S. PATENT DOCUMENTS

| | | | | |
|---|---|---|---|---|
| 3,429,333 | A | 2/1969 | Schoepe et al. | 137/315.08 |
| 3,480,787 | A | 11/1969 | Johansen | 250/221 |
| 3,487,477 | A | 1/1970 | Classen | 4/668 |
| 3,575,640 | A | 4/1971 | Ishikawa | 361/181 |
| 3,576,277 | A | 4/1971 | Blackmon | 222/1 |
| 3,606,241 | A | 9/1971 | Bornholdt | 251/52 |
| 3,638,680 | A | 2/1972 | Kopp | 137/606 |
| 3,639,920 | A | 2/1972 | Griffin et al. | 4/623 |
| 3,670,167 | A | 6/1972 | Forbes | 250/221 |
| 3,724,001 | A | 4/1973 | Ichimori et al. | 4/623 |
| 3,740,019 | A | 6/1973 | Kessell et al. | 251/129.17 |
| D228,782 | S | 10/1973 | Taiani | D13/153 |
| 3,799,198 | A | 3/1974 | Kijimoto | 137/624.11 |
| 3,802,462 | A | 4/1974 | Trösch | 137/556 |
| 3,812,398 | A | 5/1974 | Kozel et al. | 251/331 |
| 3,814,376 | A | 6/1974 | Reinicke | 251/65 |
| 3,821,967 | A | 7/1974 | Sturman et al. | 137/624.15 |
| 3,863,196 | A | 1/1975 | Hilles | 367/96 |
| 4,010,769 | A | 3/1977 | De Lorenzo et al. | 137/312 |
| 4,097,786 | A | 6/1978 | Lund | 318/282 |
| 4,107,046 | A | 8/1978 | Corder | 210/282 |
| 4,116,377 | A | 9/1978 | Andersson et al. | 236/12.1 |
| 4,141,091 | A | 2/1979 | Pulvari | 4/313 |
| 4,157,099 | A * | 6/1979 | Delker et al. | 137/625.17 |
| 4,179,691 | A | 12/1979 | Keller | 340/567 |
| 4,207,466 | A | 6/1980 | Drage et al. | 250/338.1 |
| 4,223,698 | A | 9/1980 | Reinicke | 137/595 |
| 4,225,111 | A | 9/1980 | Stahle | 251/87 |
| 4,229,811 | A | 10/1980 | Salem | 367/93 |
| 4,231,287 | A | 11/1980 | Smiley | 92/94 |
| 4,241,759 | A | 12/1980 | Billeter | 137/636.4 |
| 4,280,680 | A | 7/1981 | Payne | 251/175 |
| 4,282,430 | A | 8/1981 | Hatten et al. | 250/221 |
| 4,295,485 | A | 10/1981 | Waterfield | 137/74 |
| 4,295,653 | A | 10/1981 | Coles | 277/320 |
| 4,304,391 | A | 12/1981 | Yamaguchi | 251/129.05 |
| 4,309,781 | A | 1/1982 | Lissau | 4/304 |
| 4,383,234 | A | 5/1983 | Yatsushiro et al. | 335/253 |
| 4,402,095 | A | 9/1983 | Pepper | 4/623 |
| 4,408,745 | A | 10/1983 | Swiers et al. | 251/357 |
| 4,457,452 | A | 7/1984 | Symmons | 222/20 |
| 4,488,702 | A | 12/1984 | Lapeyre | 251/46 |
| 4,505,450 | A | 3/1985 | Saarem et al. | 251/24 |
| 4,505,451 | A | 3/1985 | Jonas | 251/285 |
| 4,520,516 | A | 6/1985 | Parsons | 4/623 |
| 4,539,474 | A | 9/1985 | Takahata | 250/221 |
| 4,543,991 | A | 10/1985 | Fuchs | 137/595 |
| 4,570,899 | A | 2/1986 | Kingham | 251/51 |
| 4,597,895 | A | 7/1986 | Bartlett | 252/392 |
| 4,604,735 | A | 8/1986 | Parsons | 367/93 |
| 4,606,085 | A | 8/1986 | Davies | 4/623 |
| 4,609,178 | A | 9/1986 | Baumann | 251/229 |
| 4,645,094 | A | 2/1987 | Acklin et al. | 222/52 |
| 4,651,777 | A | 3/1987 | Hardman | 137/487.5 |
| 4,653,534 | A | 3/1987 | Chung-Shan | 137/624.12 |
| 4,669,653 | A | 6/1987 | Avelov | 236/12.13 |
| 4,681,141 | A | 7/1987 | Wang | 137/607 |
| 4,709,728 | A | 12/1987 | Ying-Chung | 137/636.4 |
| 4,713,847 | A | 12/1987 | Oldfelt et al. | 4/316 |
| 4,717,237 | A | 1/1988 | Austin | 385/101 |
| 4,762,273 | A * | 8/1988 | Gregory et al. | 251/129.04 |
| 4,767,922 | A | 8/1988 | Stauffer | 250/221 |
| 4,796,662 | A | 1/1989 | Hoffmann et al. | 137/596.16 |
| 4,823,414 | A | 4/1989 | Piersimoni et al. | 4/623 |
| 4,823,825 | A | 4/1989 | Buchl | 137/1 |
| 4,826,129 | A | 5/1989 | Fong et al. | 251/129.04 |
| 4,826,132 | A | 5/1989 | Moldenhauer | 251/129.17 |
| 4,832,582 | A * | 5/1989 | Buffet | 417/413.1 |
| 4,836,641 | A | 6/1989 | Priaroggia | 385/100 |
| 4,839,039 | A | 6/1989 | Parsons et al. | 210/143 |
| 4,887,032 | A | 12/1989 | Hetrick | 324/207.16 |
| 4,894,698 | A | 1/1990 | Hijikigawa et al. | 257/254 |
| 4,894,874 | A * | 1/1990 | Wilson | 4/623 |
| 4,901,750 | A | 2/1990 | Nicklas et al. | 137/270 |
| 4,902,887 | A | 2/1990 | Everett, Jr. | 250/221 |
| 4,910,487 | A | 3/1990 | Kleinhappl | 335/234 |
| 4,911,401 | A | 3/1990 | Holcomb et al. | 251/30.03 |
| 4,915,347 | A * | 4/1990 | Iqbal et al. | 251/30.03 |
| 4,921,208 | A | 5/1990 | La Marca | 251/30.04 |
| 4,932,430 | A | 6/1990 | Fernstrom | 137/85 |
| 4,938,384 | A | 7/1990 | Pilolla et al. | 222/50 |
| 4,941,219 | A | 7/1990 | Van Marcke | 4/623 |
| 4,944,487 | A | 7/1990 | Holtermann | 251/129.17 |
| 4,953,141 | A | 8/1990 | Novak et al. | 367/108 |
| 4,953,236 | A | 9/1990 | Lee et al. | 4/668 |
| 4,962,790 | A | 10/1990 | Chou et al. | 137/599.08 |
| 4,972,070 | A | 11/1990 | Laverty, Jr. | 250/221 |
| 4,977,929 | A | 12/1990 | Chinnock et al. | 137/863 |
| 4,988,074 | A | 1/1991 | Najmolhoda | 251/129.08 |
| 4,989,277 | A | 2/1991 | Tsutsui et al. | 4/367 |
| 4,991,819 | A | 2/1991 | Laube | 251/35 |
| 4,998,673 | A | 3/1991 | Pilolla | 239/67 |
| 5,025,516 | A | 6/1991 | Wilson | 4/623 |
| 5,032,812 | A | 7/1991 | Banick et al. | 335/17 |
| 5,062,164 | A * | 11/1991 | Lee et al. | 4/623 |
| 5,062,453 | A | 11/1991 | Saadi et al. | 137/624.11 |
| 5,074,520 | A | 12/1991 | Lee et al. | 251/40 |
| 5,092,560 | A | 3/1992 | Chen | 251/30.03 |
| 5,095,944 | A | 3/1992 | Hochstrasser | 137/607 |
| 5,109,885 | A | 5/1992 | Tauscher | 137/554 |
| 5,111,846 | A | 5/1992 | Hochstrasser et al. | 137/607 |
| 5,125,621 | A | 6/1992 | Parsons et al. | 251/30.03 |
| 5,127,625 | A | 7/1992 | Kleinhappl | 251/129.17 |
| 5,169,118 | A | 12/1992 | Whiteside | 251/30.03 |
| 5,172,193 | A | 12/1992 | Payne et al. | 356/445 |
| 5,181,538 | A | 1/1993 | Manganaro | 137/607 |
| 5,188,337 | A | 2/1993 | Mertens et al. | 251/129.17 |
| 5,202,666 | A | 4/1993 | Knippscheer | 340/573.1 |
| 5,224,509 | A * | 7/1993 | Tanaka et al. | 251/129.04 |
| 5,244,179 | A | 9/1993 | Wilson | 251/30.03 |
| 5,245,024 | A | 9/1993 | Scarpa et al. | 536/56 |
| 5,251,188 | A | 10/1993 | Parsons et al. | 367/140 |
| 5,255,398 | A | 10/1993 | Flynn et al. | 4/496 |
| 5,265,594 | A | 11/1993 | Olsson et al. | 128/204.18 |
| 5,265,843 | A | 11/1993 | Kleinhappl | 251/129.17 |
| 5,295,654 | A | 3/1994 | Laube | 251/35 |
| 5,299,592 | A | 4/1994 | Swanson | 137/59 |
| 5,329,965 | A | 7/1994 | Gordon | 137/599.07 |
| 5,339,859 | A | 8/1994 | Bowman | 137/337 |
| 5,362,026 | A | 11/1994 | Kobayashi et al. | 251/30.02 |
| 5,375,811 | A | 12/1994 | Reinicke | 251/129.16 |
| 5,408,369 | A | 4/1995 | Miura et al. | 360/75 |
| 5,412,816 | A | 5/1995 | Paterson et al. | 4/623 |
| 5,427,351 | A | 6/1995 | Korfgen et al. | 251/39 |
| 5,433,245 | A | 7/1995 | Prather et al. | 137/554 |
| 5,455,971 | A | 10/1995 | Sakakibara et al. | 4/313 |
| 5,456,279 | A | 10/1995 | Parsons et al. | 137/245 |
| 5,456,448 | A | 10/1995 | Chou | 251/230 |
| 5,464,041 | A | 11/1995 | Reinicke | 137/595 |
| 5,467,799 | A | 11/1995 | Buccicone et al. | 137/625.41 |
| 5,473,723 | A | 12/1995 | Stockman et al. | 385/134 |
| 5,474,303 | A | 12/1995 | Coles | 277/317 |
| 5,481,187 | A | 1/1996 | Marcott et al. | 324/207.16 |
| 5,511,579 | A | 4/1996 | Price | 137/337 |
| 5,535,781 | A | 7/1996 | Paterson et al. | 137/624.11 |
| 5,539,198 | A | 7/1996 | McMichael et al. | 250/221 |
| 5,548,119 | A | 8/1996 | Nortier | 250/341.1 |
| 5,555,912 | A | 9/1996 | Saadi et al. | 137/801 |
| 5,564,462 | A | 10/1996 | Storch | 137/337 |
| 5,566,702 | A | 10/1996 | Philipp | 137/1 |
| 5,570,869 | A | 11/1996 | Diaz et al. | 251/129.04 |
| 5,574,617 | A | 11/1996 | Shimanuki et al. | 361/154 |
| 5,583,434 | A | 12/1996 | Moyers et al. | 324/207.16 |
| 5,584,465 | A | 12/1996 | Ochsenreiter | 251/65 |
| 5,586,746 | A * | 12/1996 | Humpert et al. | 4/623 |
| 5,595,216 | A | 1/1997 | Pilolla | 137/607 |
| 5,599,003 | A | 2/1997 | Seemann et al. | 251/30.03 |
| 5,600,237 | A | 2/1997 | Nippert | 324/207.16 |
| 5,636,601 | A | 6/1997 | Moriya et al. | 123/90.11 |
| D381,008 | S | 7/1997 | Parsons et al. | D13/153 |
| 5,655,747 | A | 8/1997 | Pasut | 251/30.03 |
| 5,655,748 | A | 8/1997 | Regelbrugge et al. | 251/54 |
| 5,668,366 | A | 9/1997 | Mauerhofer | 250/221 |
| 5,708,355 | A | 1/1998 | Schrey | 323/282 |
| 5,716,038 | A | 2/1998 | Scarffe | 251/30.03 |
| 5,730,165 | A | 3/1998 | Philipp | 251/129.04 |
| 5,747,684 | A | 5/1998 | Pace et al. | 73/119 |

| | | |
|---|---|---|
| 5,758,688 A | 6/1998 | Hamanaka et al. ...... 137/624.11 |
| D396,090 S | 7/1998 | Marcichow et al. ......... D23/233 |
| 5,775,372 A | 7/1998 | Houlihan ................. 137/624.12 |
| 5,785,955 A | 7/1998 | Fischer ........................... 424/49 |
| 5,787,915 A | 8/1998 | Bryers et al. ..................... 137/1 |
| 5,787,924 A | 8/1998 | Cewers et al. ............. 137/487.5 |
| 5,797,360 A | 8/1998 | Pischinger et al. ........ 123/90.11 |
| 5,804,962 A | 9/1998 | Kather et al. ............ 324/207.16 |
| 5,815,362 A | 9/1998 | Kahr et al. .................... 361/153 |
| 5,868,311 A * | 2/1999 | Cretu-Petra ....................... 4/623 |
| 5,883,557 A | 3/1999 | Pawlak et al. ................. 335/179 |
| 5,900,201 A | 5/1999 | Chatterjee et al. ............. 264/109 |
| 5,905,625 A | 5/1999 | Schebitz ....................... 361/154 |
| 5,911,240 A * | 6/1999 | Kolar et al. ................... 137/801 |
| 5,918,855 A | 7/1999 | Hamanaka et al. ...... 251/129.04 |
| 5,927,328 A | 7/1999 | Nelson et al. ............ 137/624.12 |
| 5,941,505 A | 8/1999 | Nagel ....................... 251/335.2 |
| 5,964,192 A | 10/1999 | Ishii .......................... 123/90.11 |
| 5,979,500 A | 11/1999 | Jahrling et al. .......... 137/624.12 |
| 5,984,262 A | 11/1999 | Parsons et al. .......... 251/129.04 |
| 6,003,170 A | 12/1999 | Humpert et al. ......... 251/129.04 |
| 6,039,067 A | 3/2000 | Houlihan ..................... 137/337 |
| 6,044,814 A | 4/2000 | Fuwa ........................ 123/90.11 |
| 6,073,904 A | 6/2000 | Diller et al. ................ 251/30.03 |
| 6,085,790 A | 7/2000 | Humpert et al. ............... 137/801 |
| 6,123,839 A | 9/2000 | Sussman ....................... 210/136 |
| 6,127,671 A | 10/2000 | Parsons et al. ................. 250/221 |
| 6,155,231 A | 12/2000 | Adachi et al. ................. 123/399 |
| 6,158,715 A | 12/2000 | Kirschbaum ............. 251/129.06 |
| 6,250,601 B1 | 6/2001 | Kolar et al. ............. 251/129.04 |
| 6,293,516 B1 * | 9/2001 | Parsons et al. .................. 251/65 |
| 6,298,872 B1 | 10/2001 | Keller ........................... 137/360 |
| 6,305,662 B1 | 10/2001 | Parsons et al. ........... 251/129.04 |
| 6,393,634 B1 | 5/2002 | Kodaira et al. ................... 4/623 |
| 6,394,414 B1 | 5/2002 | Breitling et al. ......... 251/129.04 |
| 6,408,881 B2 * | 6/2002 | Lorenzelli et al. ............. 137/801 |
| 6,425,415 B2 | 7/2002 | Lorenzelli et al. ....... 137/624.11 |
| 6,450,478 B2 | 9/2002 | Parsons et al. ........... 251/129.04 |
| 6,619,320 B2 * | 9/2003 | Parsons ......................... 137/801 |
| 6,712,332 B1 * | 3/2004 | Storm ...................... 251/129.04 |
| 6,770,869 B2 * | 8/2004 | Patterson et al. ................. 4/623 |
| 6,871,835 B2 * | 3/2005 | Parsons ...................... 251/30.03 |
| 6,913,203 B2 | 7/2005 | DeLangis ................ 251/129.04 |
| 7,025,227 B2 * | 4/2006 | Oliver et al. .................... 222/61 |
| 7,069,941 B2 | 7/2006 | Parsons et al. ............. 251/30.03 |
| 7,107,631 B2 * | 9/2006 | Lang et al. ........................ 4/623 |

* cited by examiner

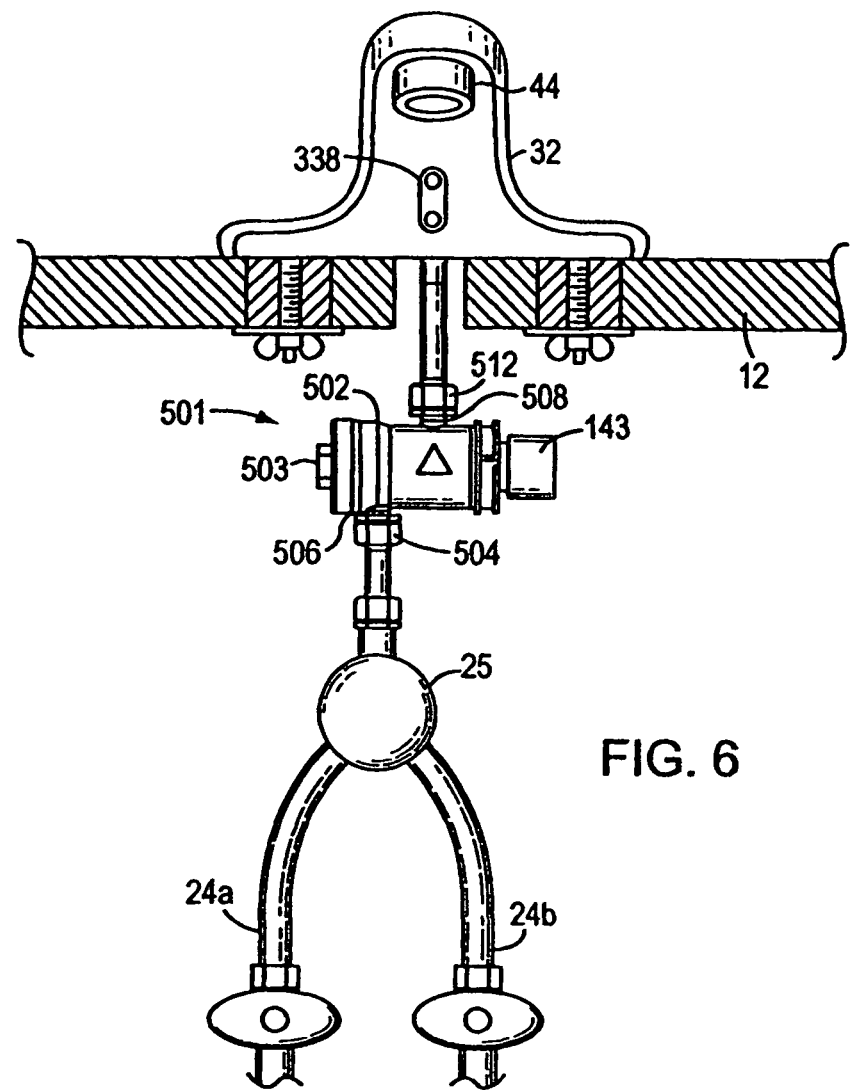

ELECTRONIC FAUCETS FOR LONG-TERM OPERATION

This application is a continuation of U.S. application Ser. No. 11/480,780, filed Jul. 3, 2006, now U.S. Pat. No. 7,690,623, which is a continuation of U.S. application Ser. No. 10/860,938, filed on Jun. 3, 2004, now U.S. Pat. No. 7,069,941, which is a continuation of PCT Application PCT/US02/38757, filed on Dec. 4, 2002, entitled "Electronic Faucets for Long-Term Operation," which is a continuation-in-part of U.S. application Ser. No. 10/011,423, filed on Dec. 4, 2001, now U.S. Pat. No. 6,619,320. The PCT Application PCT/US02/38757 also claims priority from U.S. Provisional Application 60/391,282 filed Jun. 24, 2002.

This invention relates to electronic metering faucets and methods for operating and controlling such faucets.

In public facilities or large private facilities, there are several different types of metering faucets in use today. Many are manually activated to turn on the water by pressing the faucet head and are hydraulically timed so that the water remains on for a set period of time after depression of the head. Some of these faucets have separate head allowing separate control over the hot and cold water. Other metering faucets mix the incoming hot and cold water streams and, when actuated, deliver a tempered output stream.

Also known is a manually activated metering faucet whose on-time is controlled electronically. Still other known faucets are activated electronically when the user positions a hand under the faucet. automatic water dispensing systems have provided numerous advantages including improved sanitation, water conservation, and reduced maintenance cost. Since numerous infectious diseases are transmitted by contact, public-health authorities have encouraged the public and mandated to food workers the exercise of proper hygiene including washing hands effectively. Effective hand washing has been made easier by automatic faucets. Automatic faucets typically include an object sensor that detects presence of an object, and an automatic valve that turns water on and off based on a signal from the sensor. If the water temperature in an automatic faucet is not in an optimal range, individuals tend to shorten their hand washing time. To obtain an optimal water temperature, a proper mixing ratio of hot and cold water and proper water actuation has to be achieved. Automatic faucets usually use a preset valve that controls water flow after mixing.

The hydraulically timed faucets are disadvantaged in that it is difficult to accurately control the on-time of the faucet over the long term because of mains pressure changes and foreign matter build up in the faucet which can adversely affect the hydraulic controls within the faucet. On the other hand, the known electronic faucets can not always discriminate between a user's hand and other substances and objects which may be brought into proximity to the faucet, e.g. a reflective object disposed opposite the faucet's infrared transceiver, soap build up on the faucet's proximity sensor, etc. Resultantly, those prior faucets may be turned on inadvertently and/or remain on for too long a time resulting in wastage of water.

SUMMARY OF THE INVENTION

The present invention generally relates to automatic sensor based faucets and methods of operating such faucets.

According to another aspect, the present invention is a sensor-based flow-control system, such as a sensor-based faucet. The sensor-based flow-control system includes a valve interposed in a conduit and controlled by an electromechanical actuator, and a sensor for generating sensor output signals to an electronic control circuit constructed and arranged to provide the control signals to the electromechanical actuator for opening and closing the valve.

Specifically, the present invention is a sensor-based faucet having a hot and cold water inlet and an outlet. A sensor generates sensor output signals provided to an electronic control circuit constructed and arranged to provide control signals to an electromechanical actuator.

Preferred embodiments of this aspect include one or more of the following features:

The electromechanical actuator may be coupled to only one valve interposed in one conduit delivering premixed hot and cold water. The electromechanical actuator may coupled to another type of a valve for controlling flow of hot and cold water in two separate conduits, as described in PCT application PCT/US01/43277. Alternatively, the control signals may be delivered to two electromechanical actuators constructed and arranged to control separately two valves and thereby control separately water flow in two separate conduits with hot and cold water delivered to a faucet.

According to another aspect of the present invention, a faucet is activated by touch and/or proximity to the faucet and thereafter provides a consistent water delivery period over the life of the faucet.

The described electronic metering faucets have numerous advantages. The electronic faucets provide long-term reliable operation. The faucets are activated using an object sensor or a touch sensor (capacitive or other touch or proximity)

The faucet is electronically timed and maintains its timing accuracy over the life of the faucet.

The described faucets are self-contained battery operated, electronic metering faucets which can operate for over two, three or more years between battery replacements. The faucet which has a minimum number of moving parts, and the individual parts may be accessed quite easily for maintenance purposes. The faucets can be manufactured and maintained at relatively low cost.

According to another aspect, the present invention is a novel interface for calibrating or programming a sensor-based faucet. The interface interacts with a user via an object sensor couple to a microprocessor for controlling the water flow in the faucet. The sensor-based faucet includes a valve interposed in a conduit and controlled by an electromechanical actuator, and a sensor for generating sensor output signals to an electronic control circuit constructed and arranged to provide the control signals for opening and closing the valve. The control circuit may direct the valve to provide a predetermined number of water bursts at different steps of various algorithms to communicate with a user. The control circuit may control the valve to provide pulsating water delivery when sensing different problems such as a battery low state, an electrical problem or a mechanical problem in one of the faucet's elements.

According to another aspect, the present invention is a sensor-based faucet that is constructed using materials that prevent or significantly reduce bacterial or other biological growth in water regulated by the faucet. Furthermore, sensor-based faucet that is constructed to execute automatically a flushing algorithm in order to flush water contained in the faucet for a predetermined period of time and thus flush bacterial contamination that may have grown inside the faucet. The control circuit may provide also signals to an optical, acoustic or other indicator when such flushing algorithm is executed.

According to another aspect, the present invention is a sensor-based faucet having a hot and cold-water inlet and an outlet. A sensor generates sensor output signals provided to an electronic control circuit constructed and arranged to provide control signals to an electromechanical actuator. The control circuit provides also signal to an optical, acoustic or other indicator starts signaling when the actuator first opens the valve. The control circuit provides signals to the indicator that continues signaling for a predetermined duration to indicate to a user that a time interval prescribed as necessary for effective hand washing has not yet expired. When the interval does expire, the user is thereby assured that he has complied with the relevant duration regulation.

According to another aspect, the present invention is a novel valve device and the corresponding method for controlling flow-rate of fluid between the input and output ports of the valve device. A novel valve device includes a fluid input port and a fluid output port, a valve body, and a fram assembly. The valve body defines a valve cavity and includes a valve closure surface. The fram assembly provides two pressure zones and is movable within the valve cavity with respect a guiding member. The fram assembly is constructed to move to an open position enabling fluid flow from the fluid input port to the fluid output port upon reduction of pressure in a first of the two pressure zones and is constructed to move to a closed position, upon increase of pressure in the first pressure zone, creating a seal at the valve closure surface.

According to preferred embodiments, the two pressure zones are formed by two chambers separated by the fram assembly, wherein the first pressure zone includes a pilot chamber. The guiding member may be a pin or internal walls of the valve body.

The fram member (assembly) may include a pliable member and a stiff member, wherein the pliable member is constructed to come in contact with a valve closure surface to form seal (e.g., at a sealing lip located at the valve closure surface) in the closed position. The valve device may include a bias member. The bias member is constructed and arranged to assist movement of the fram member from the open position to the closed position. The bias member may be a spring.

The valve is controlled, for example, by an electromechanical operator constructed and arranged to release pressure in the pilot chamber and thereby initiate movement of the fram assembly from the closed position to the open position. The operator may include a latching actuator (as described in U.S. Pat. No. 6,293,516, which is incorporated by reference), a non-latching actuator (as described in U.S. Pat. No. 6,305,662, which is incorporated by reference), or an isolated operator (as described in PCT Application PCT/US01/51098, which is incorporated by reference). The valve may also be controlled may also including a manual operator constructed and arranged to release pressure in the pilot chamber and thereby initiate movement of the fram member from the closed position to the open position.

The novel valve device including the fram assembly may be used to regulate water flow in an automatic or manual faucet.

According to yet another aspect, the present invention is a novel electromagnetic actuator and a method of operating or controlling such actuator. The electromagnetic actuator includes a solenoid wound around an armature housing constructed and arranged to receive an armature including a plunger partially enclosed by a membrane. The armature provides a fluid passage for displacement of armature fluid between a distal part and a proximal part of the armature thereby enabling energetically efficient movement of the armature between open and closed positions. The membrane is secured with respect to the armature housing and is arranged to seal armature fluid within an armature pocket having a fixed volume, wherein the displacement of the plunger (i.e., distal part or the armature) displaces the membrane with respect to a valve passage thereby opening or closing the passage. This enables low energy battery operation for a long time.

Preferred embodiments of this aspect include one or more of the following features: The actuator may be a latching actuator (including a permanent magnet for holding the armature) of a non-latching actuator. The distal part of the armature is cooperatively arranged with different types of diaphragm membranes designed to act against a valve seat when the armature is disposed in its extended armature position. The electromagnetic actuator is connected to a control circuit constructed to apply said coil drive to said coil in response to an output from an optional armature sensor.

The armature sensor can sense the armature reaching an end position (open or closed position). The control circuit can direct application of a coil drive signal to the coil in a first drive direction, and in responsive to an output from the sensor meeting a predetermined first current-termination criterion to start or stop applying coil drive to the coil in the first drive direction. The control circuit can direct or stop application of a coil drive signal to the coil responsive to an output from the sensor meeting a predetermined criterion.

According to yet another aspect, the present invention is a novel assembly of an electromagnetic actuator and a piloting button. The piloting button has an important novel function for achieving consistent long-term piloting of a main valve. The present invention is also a novel method for assembling a pilot-valve-operated automatic flow controller that achieves a consistent long-term performance.

Method of assembling a pilot-valve-operated automatic flow controller includes providing a main valve assembly and a pilot-valve assembly including a stationary actuator and a pilot body member that includes a pilot-valve inlet, a pilot-valve seat, and a pilot-valve outlet. The method includes securing the pilot-valve assembly to the main valve assembly in a way that fluid flowing from a pressure-relief outlet of the main valve must flow through the pilot-valve inlet, past the pilot-valve seat, and through the pilot-valve outlet, whereby the pilot-valve assembly is positioned to control relief of the pressure in the pressure chamber (i.e., pilot chamber) of the main valve assembly. The main valve assembly includes a main valve body with a main-valve inlet, a main-valve seat, a main-valve outlet, a pressure chamber (i.e., a pilot chamber), and a pressure-relief outlet through which the pressure in the pressure chamber (pilot chamber) can be relieved. A main valve member (e.g., a diaphragm, a piston, or a fram member) is movable between a closed position, in which it seals against the main-valve seat thereby preventing flow from the main inlet to the main outlet, and an open position, in which it permits such flow. During the operation, the main valve member is exposed to the pressure in the pressure chamber (i.e., the pilot chamber) so that the pressurized pilot chamber urges the main valve member to its closed position, and the unpressurized pilot chamber (when the pressure is relieved using the pilot valve assembly) permits the main valve member to assume its open position.

Briefly, one type of the metering faucet is a touch activated, electronically timed faucet that can deliver water at a selected temperature for a preset water delivery period which, unless reset, remains substantially constant, i.e. within 2%, over the faucet's life span. The faucet includes a simple non-water-contacting housing or encasement, which is adapted to be secured to a sink or countertop. Supported in the housing is a single cartridge containing most of the hydraulic components of the faucet including a solenoid-actuated valve which controls the delivery of water from hot and cold water lines to a single outlet at the end of a faucet spout formed by the housing. The housing or encasement also supports a stationary faucet head which contains all of the electrical components necessary to actuate the valve for a selected period of time after a user's hand touches or is moved into close proximity to a selected target area on the head.

As we shall see, the faucet includes provisions for preventing inadvertent faucet activation by non-environmental factors such as soap build up, contact by paper towels, etc., as well as accidental human contact. This is accomplished by dynamically adjusting in real time the faucet's activation sensitivity depending upon the prevailing conditions. Once activated, the faucet will deliver a stream of water at a set temperature for a predetermined time period. At the end of that period, the faucet's internal controls will issue a shut-off command, which positively shuts off the faucet's solenoid valve.

Further as we will come apparent, the faucet is designed so that its components can readily be made and assembled and is accessed quiet easily by maintenance personnel for repair purposes. Still, the faucet can be made in quantity at a relatively low cost.

BRIEF DESCRIPTION OF THE DRAWINGS

FIG. 6 is another embodiment of a faucet using a valve device located below a faucet mounting surface.

DESCRIPTION OF THE PREFERRED EMBODIMENT

Figures 1, 2:
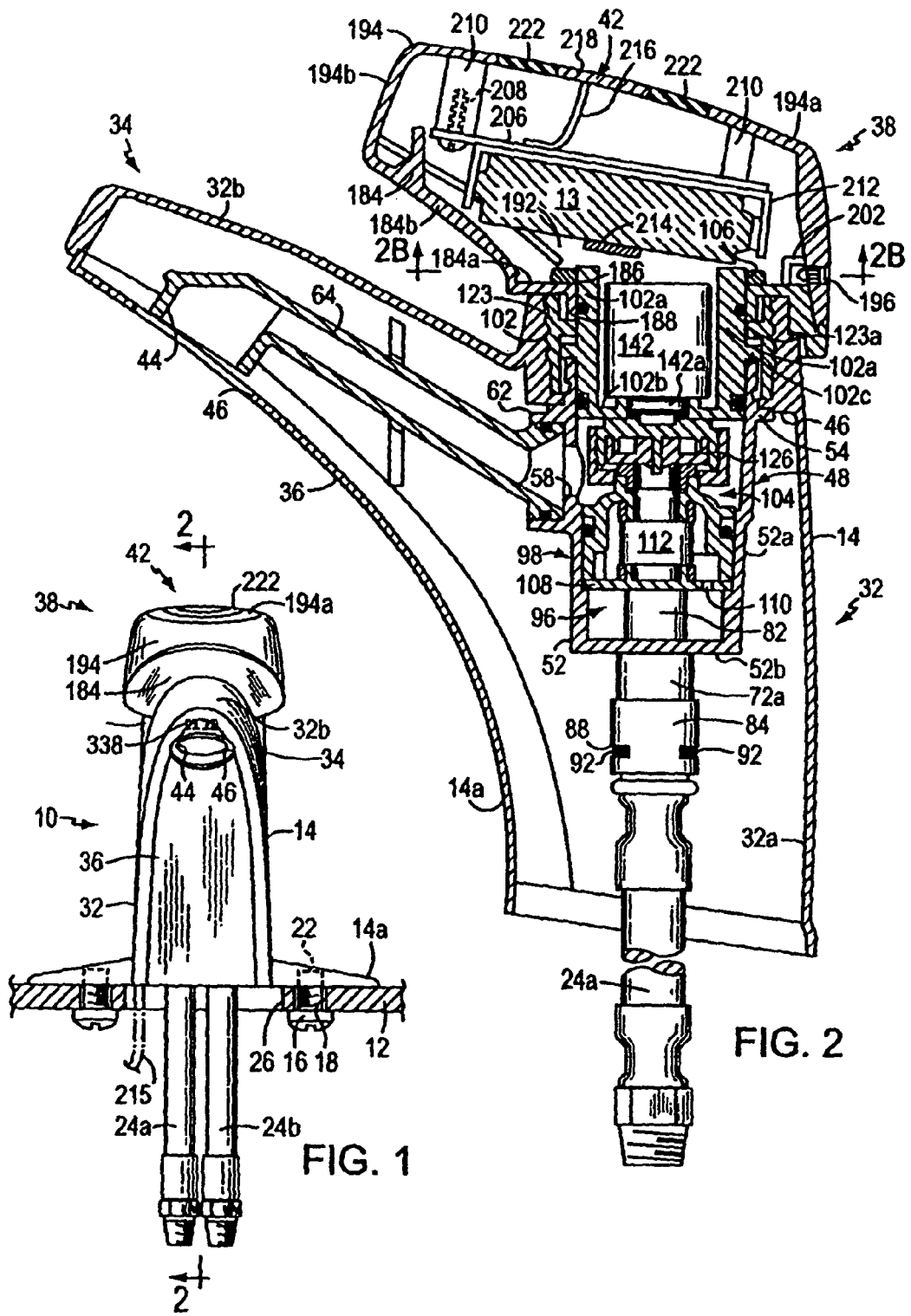
FIG. 1 is a front elevational view with parts in section showing a faucet installed on a countertop.
FIG. 2 is a sectional view of one embodiment of the faucet taken along line 2-2 of FIG. 1.

Referring to FIG. 1, the subject faucet 10 is shown mounted to a countertop 12. The faucet includes a housing or encasement 14 having a more or less semicircular flange 14a at its lower end. Fasteners 16 inserted through holes 18 in countertop 12 are threaded into holes 22 in flange 14a to secure the faucet to the countertop. Faucet 10 also includes flexible hot and cold water lines 24a and 24b which extend from the lower end of housing 14 through a large opening 26 in countertop 12. These water lines are adapted to be coupled to hot and cold water mains.

As shown in FIGS. 1 and 2, faucet housing 14 actually consists of a shell-like part 32 forms an upright main body portion 32a (including flanges 14a) and the upper portion 32b of a spout extending out from the main body portion 32a. The open front of main body portion 32a and the underside of the spout portion 32b are normally closed by a removable cover plate 36 clipped or otherwise secured to the edges of portions 34a and 34b.

Faucet 10 also has a stationary head 38 mounted to the top of housing 14. Head 38 incorporates a touch sensor shown generally at 42 which, when touched, activates faucet 10 so that a stream of tempered water issues from an outlet 44 centered in an opening 46 provided in the cover plate 36 near the end of spout 34.

As best seen in FIG. 2, the upper end segment of the main body portion 32a has a thickened internally threaded wall forming a circular ledge 46 which functions as a stop for a cylindrical cartridge shown generally at 48. Cartridge 48 includes a side wall 52a, a bottom wall 52b, the top of the cartridge being open. A circular flange 54 extends out from side wall 52a and that flange is adapted to seat against ledge 46. The cartridge is held in place within the shell portion 32a by a bushing 56 which is screwed down into the open top of main body portion 32a.

An opening 58 is provided in the side wall 52a of cartridge 48 and an exterior collar 62 surrounds that opening into which is press fit one end of a conduit 64 which extends within the upper spout portion 32b. The other end of that conduit constitutes the faucet outlet 44. Preferably, there is sufficient clearance between the outlet 44 and the edge of opening 46 in the cover plate 36 to permit a conventional aerator (not shown) to be installed at outlet 44.

Figure 3:
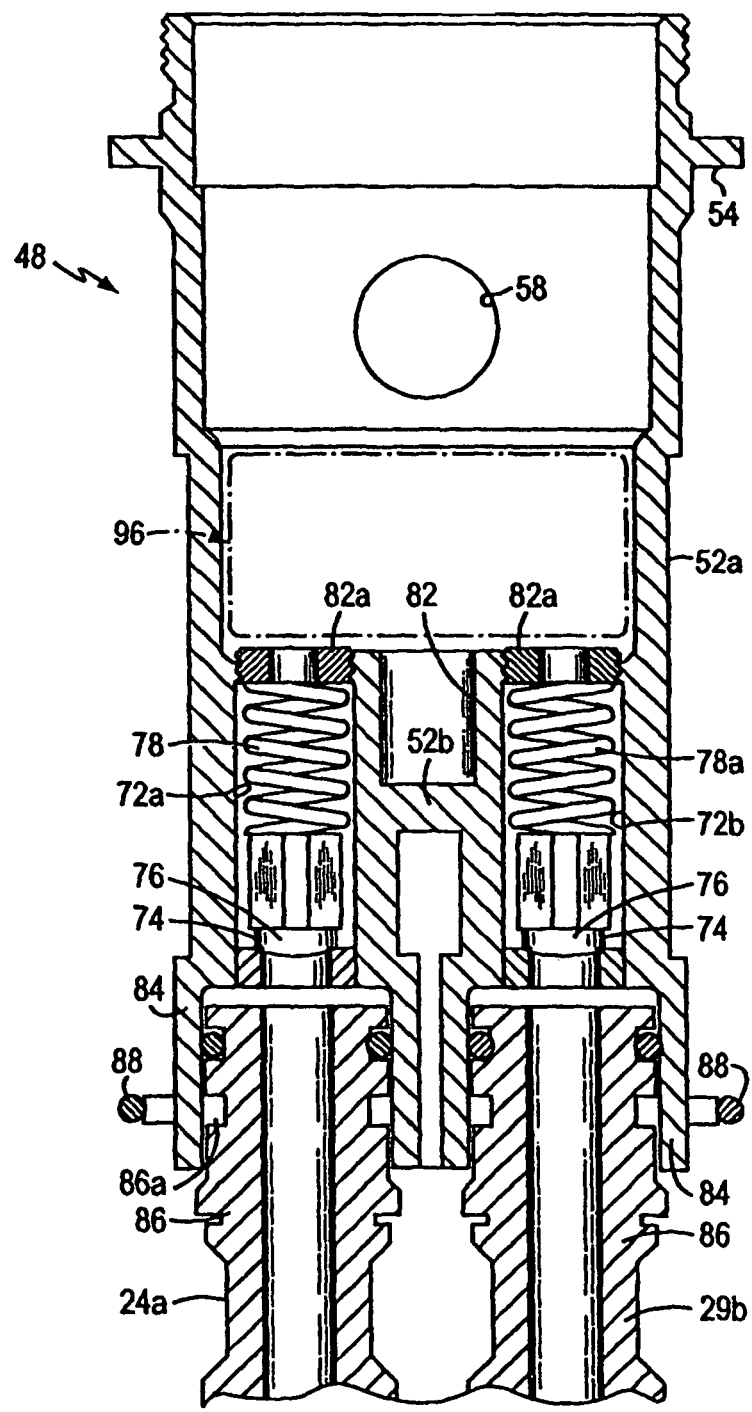
FIG. 3 is a fragmentary sectional view showing a portion of the FIG. 2 faucet in greater detail.

Referring to FIGS. 2 and 3, cartridge 48 includes a pair of side by side inlet conduits 72a and 72b which extend down from the cartridge bottom wall 52b. Formed midway along each such conduit is an annular valve seat 74 for seating vertically moveable valve member 76. Each valve member is biased against its seat by a coil spring 78 seated within a sleeve 82 extending up from a cartridge bottom wall 52b within the cartridge. Each spring 78 is compressed between the upper end of the corresponding valve member 76 and a stop 82a provided at the upper end of each sleeve 82.

The lower end segment of the cartridge conduit 72a forms a female connector 84 which is arranged to receive a corresponding male connector 86 provided at the upper end of the water line 24a. The illustrated connector 86 is a conventional quick release connector which is held in place by a C-clip 88 whose arms extend through slots 92 in the opposite sides of connector 84 and engage in a groove 86a in male connector 86.

The cold water line 24b is connected in a similar fashion to conduit 72b of cartridge 48. It is thus apparent from FIG. 3 that each of the hot and cold water lines 24a, 24b conducts water into cartridge 48 via a check valve so that water can flow into, but not out of, cartridge 48 via conduits 72a and 72b.

Figure 4:
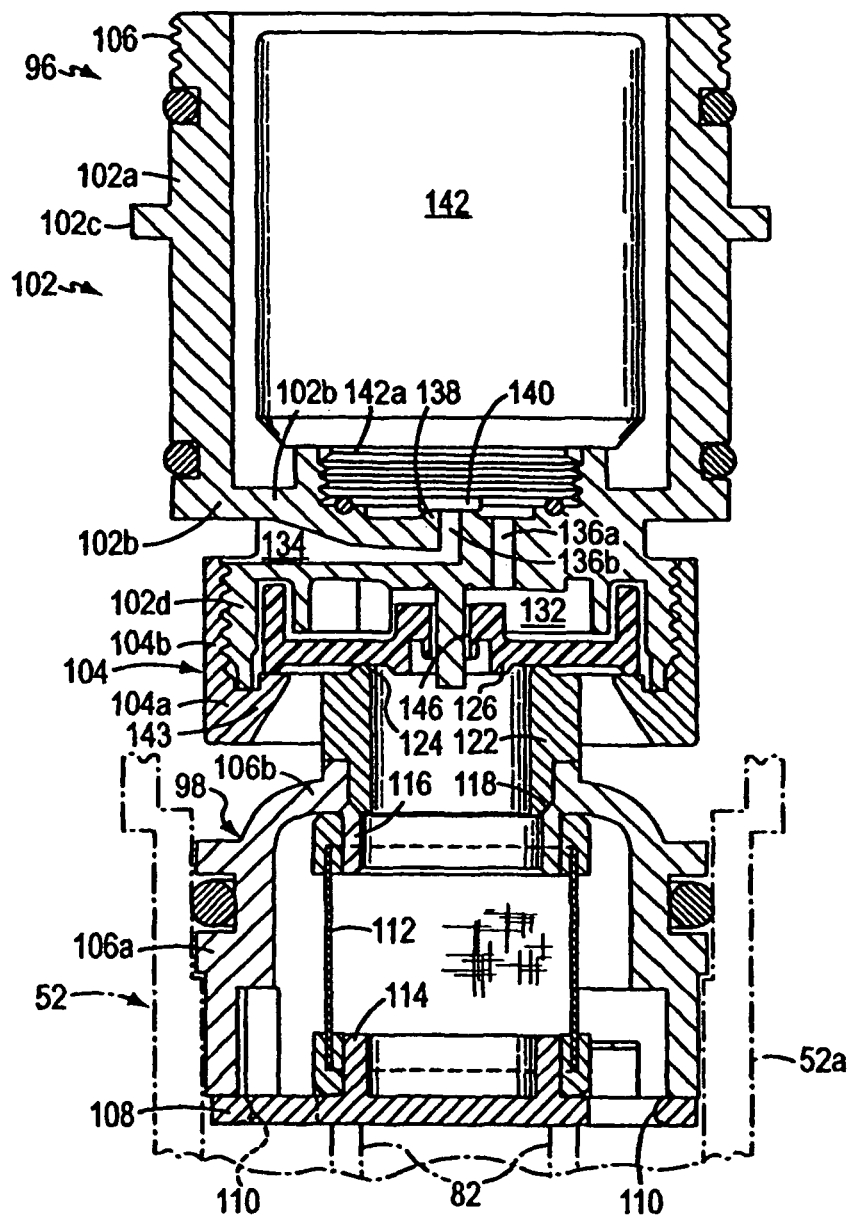
FIG. 4 is a fragmentary sectional view of a portion of the faucet shown in FIG. 2.

The cartridge 48 contains an electro-mechanical valve assembly shown generally at 96 which controls the flow of hot and cold water from lines 24a and 24b to the faucet outlet 44. As shown in FIGS. 2 to 4, assembly 96 sits on the two sleeves 82 projecting up from the cartridge bottom wall 52b. As specified in FIG. 4, the valve assembly 96 comprises lower filter housing shown generally at 98, an upper valve housing in 102, the two housings being releasably connected together by coupling 104. The housing 98 is shaped generally like an inverted cup. It has a sidewall 106 and a top wall 106b. The open bottom of the housing is substantially closed by a circular metering plate 108, which is the part of the valve assembly that actually sits on the sleeves 82 extending up from the cartridge bottom wall 52a. Referring also to FIG. 4, the metering plate 108 does have metering holes 110 which are aligned with sleeves 82 so that hot and cold water is conducted via those holes from the water lines 24a and 24b to the interior of housing 98. Housing 98 contains a vertically oriented filter element 112 whose opposite ends are captured by an upstanding wall 114 formed in plate 108 and a second wall 116 which extend down from the housing top wall 106b. There is also an opening 118, near the housing top wall 106b, which provides water passage with the interior of the tubular neck 122 extending up around the housing top wall 106b.

The interior of housing 98 is configured so that hot and cold water entering the housing is conducted to the periphery of the filter element 112 whereupon the water flows into the interior of the filter element and out of the filter element through the large opening 118 and neck 122. The flow rates of the hot and cold water into the housing are controlled by the relative sizes of the metering holes 110 and the metering plate 108. The hot and cold water are mixed within housing 98 so that the water leaving the housing through the neck 122 has a selected temperature. That temperature may be changed by substituting different metering plates 108 in the valve assembly. Alternatively, a rotatably adjustable metering plate with holes co-operatively arranged with metering holes 110 is used to adjust the mixing ratio of hot and cold water.

Shown in FIG. 4, the upper end of neck 122 is shaped leftwardly extending circular valve seat 124. When housing 98 is connected to housing 102 by coupling 104, a valve member 126 in the form of a diaphragm is adapted to move up and down with respect to valve seat 124 to control the flow of water out of the neck 122. A valve member 126 is supported on its periphery within the valve housing 102.

Still referring to FIG. 4, the upper valve housing 102 has a cylindrical side wall 102a and a relatively thick bottom wall 102b the top of the housing being open. A flange 102c encircles sidewall 102a about a third of the way down on that wall. Also an upper end segment of the sidewall is threaded as shown at 106.

Housing 102 is arranged to contain a cylinder solenoid 142 having an externally threaded neck 142a which is threaded into a collar 113 which extends up from the housing bottom wall 102b. Solenoid 142 has an armature plunger 40 which extends down through the housing bottom wall 102b and is connected to diaphragm member 126 which is part of a more or less conventional pilot valve assembly, e.g. of the type described in U.S. Pat. No. 5,125,621, the contents of which is hereby incorporated herein by reference. When solenoid 142 is energized, its armature 140 is retracted thereby opening a vent passage 136b. Vent passage 136b then is in communication with a pilot chamber 132 via a vent passage 136a. Releasing pressure in pilot chamber 132 moves diaphragm valve member 126 away from valve seat 124 allowing water to flow from the filter housing 98 past the valve seat to the opening 58 (FIG. 3) in cartridge 48 and thence via conduit 64 to the faucet outlet 44 shown in FIG. 2.

On the other hand, when solenoid plunger 140 seals passage 136b, pressure in pilot chamber 132 increases by water flowing through a V-shaped or U-shaped groove in the pin and opening 146. When the pressure is equalized, diaphragm member 126 is seated against valve seat 124, and no water flows from the faucet.

As shown in FIG. 2, the valve assembly 96 is positioned in cartridge 48 so that the meter in plate 108 sits on the sleeves 82 with the metering holes 110 in that plate is aligned with those sleeves. In this position of the cartridge, the flange 102c of the valve housing 102 sits on the upper edge of the cartridge. To retain the valve assembly in this position, an externally threaded bushing is screwed down into the upper end segment of the main body portion 32a of housing 32. The bushing has a radially inwardly extending flange which bears down against the flange 104 of the valve housing 102 to hold the valve assembly in place within the cartridge 48. As shown in FIG. 2, when seated, the upper end of the bushing is flush with the upper end of the housing main body portion 32a and the threaded upper end 106 of the valve housing 102 extends appreciably above the bushing.

Figure 2A:
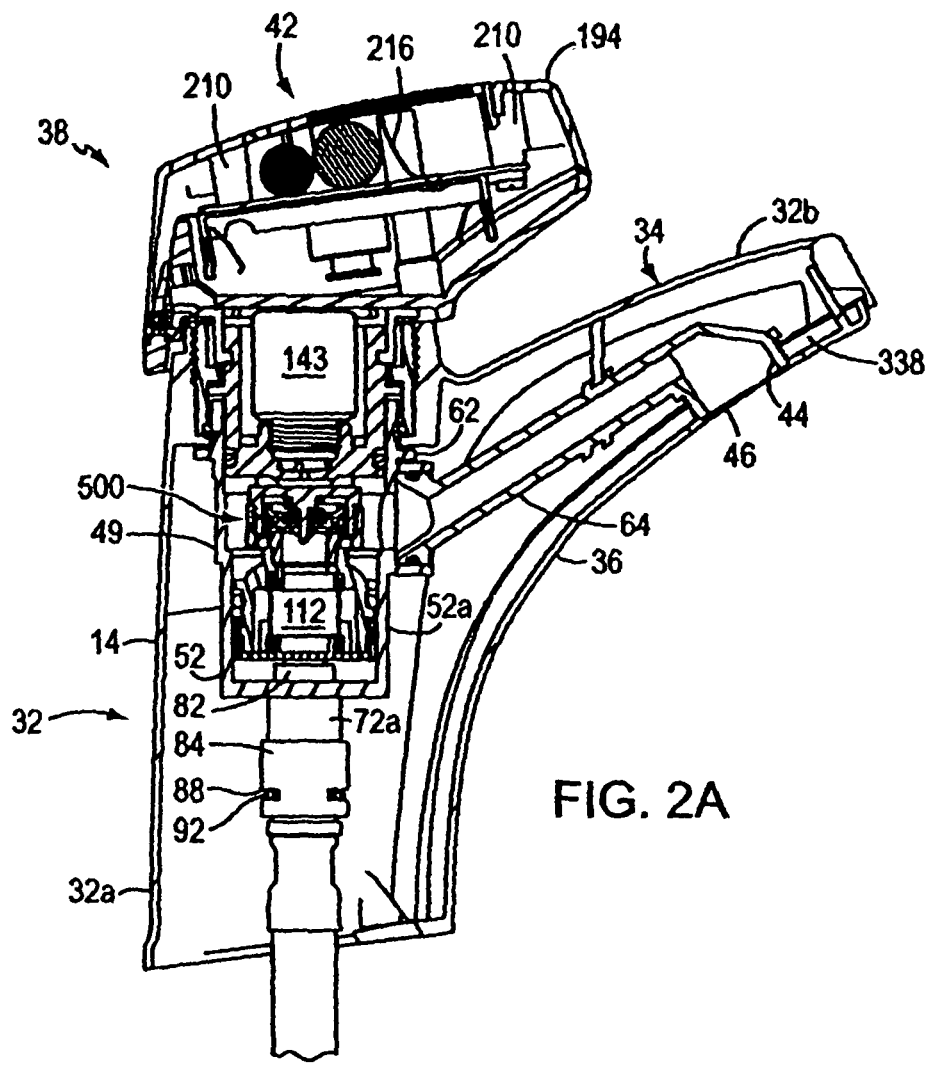
FIG. 2A is a sectional view of another embodiment of the faucet taken along line 2-2 of FIG. 1.

Referring now to FIGS. 2 and 2A, the faucet head or cap 38 is secured to the upper end of the valve housing 32. Head 38 comprises a lower housing portion 184 comprising a bottom wall 184a and a sidewall 184b which flares out and up above the faucet spout 34. A large hole 186 is provided in bottom wall 184a so that the housing portion 184 can be seated on the top of the main body portion 32a and the bushing. A collar surrounds opening 186, which extends down between the sidewall 102a of valve housing 102 and the bushing with the bottom of that collar resting on the flange 184a to help stabilize head 38. The housing portion 184b is held in place by an internally threaded ring 192 which is turned down onto the threaded upper end 106 of the valve assembly housing 102a.

Figure 2B:
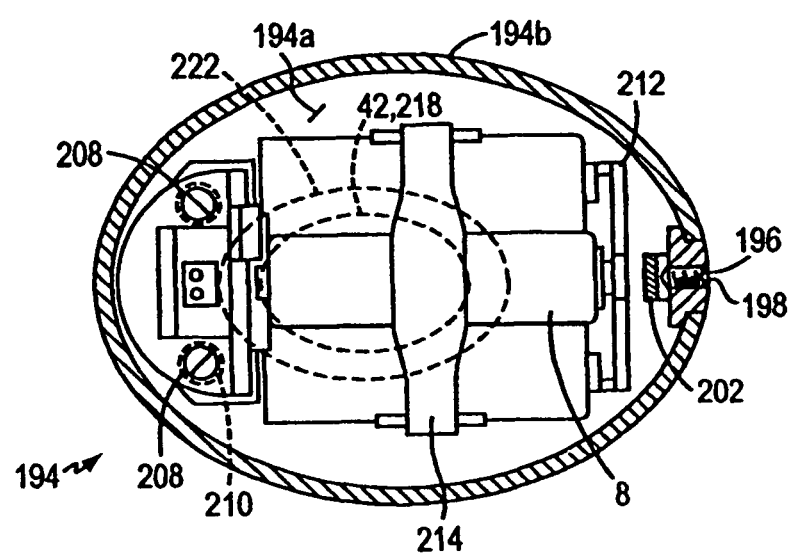
FIG. 2B is a sectional view taken along the line of 2B-2B of FIG. 2.

Referring to FIG. 2B, faucet head 38 also includes an upper housing portion 194 in the form of a cap. Portion 194 includes a top wall 194a and an all-around side wall 194b whose lower edge interfits with the upper edge of housing portion 184 so that the head forms a hollow enclosure. Housing portion 194 is releasably secured to housing portion 184 by a set screw 196 which is screwed into a threaded hole 198 in the housing portion side wall 194b at the rear of the faucet. When tightened, the set screw 196 engages a detent 202 formed at the rear of the housing portion 184 as also shown in FIG. 2.

As noted above, the faucet head 38 contains the electrical components necessary to operate the faucet's valve assembly 96. More particularly, as shown in FIGS. 2 and 2B, a printed circuit board 206 is secured by threaded fasteners 208 to a pair of posts 210 extending down from the top wall 194a of the upper housing section 194. Secured to the underside of the printed circuit board 206 is a battery holder 212 which supports a plurality of batteries B and electrically connects those batteries to terminals on the printed circuit board 206 so as to power the various electrical components on the printed circuit board to be described later. The batteries B may be releasably secured to the battery holder 212 by a strap 214 or other suitable means.

As best seen in FIG. 2, an electrically lead 216 extends up from circuit board 206 to a metal pad 218 incorporated into a top wall 194a of the upper housing section 194. Pad 218 is surrounded by an electrically insulating ring 222 which electrically isolates the pad from the remainder of top wall 194a.

That pad 218 constitutes the faucet % touch sensor 42 also described in connection with the circuit/block diagram below. As described in connection with FIG. 2, all of the electrical components in head 38 may be accessed simply by loosening the set screw 196 and separating the upper housing 194 from section 184.

Figure 4A:
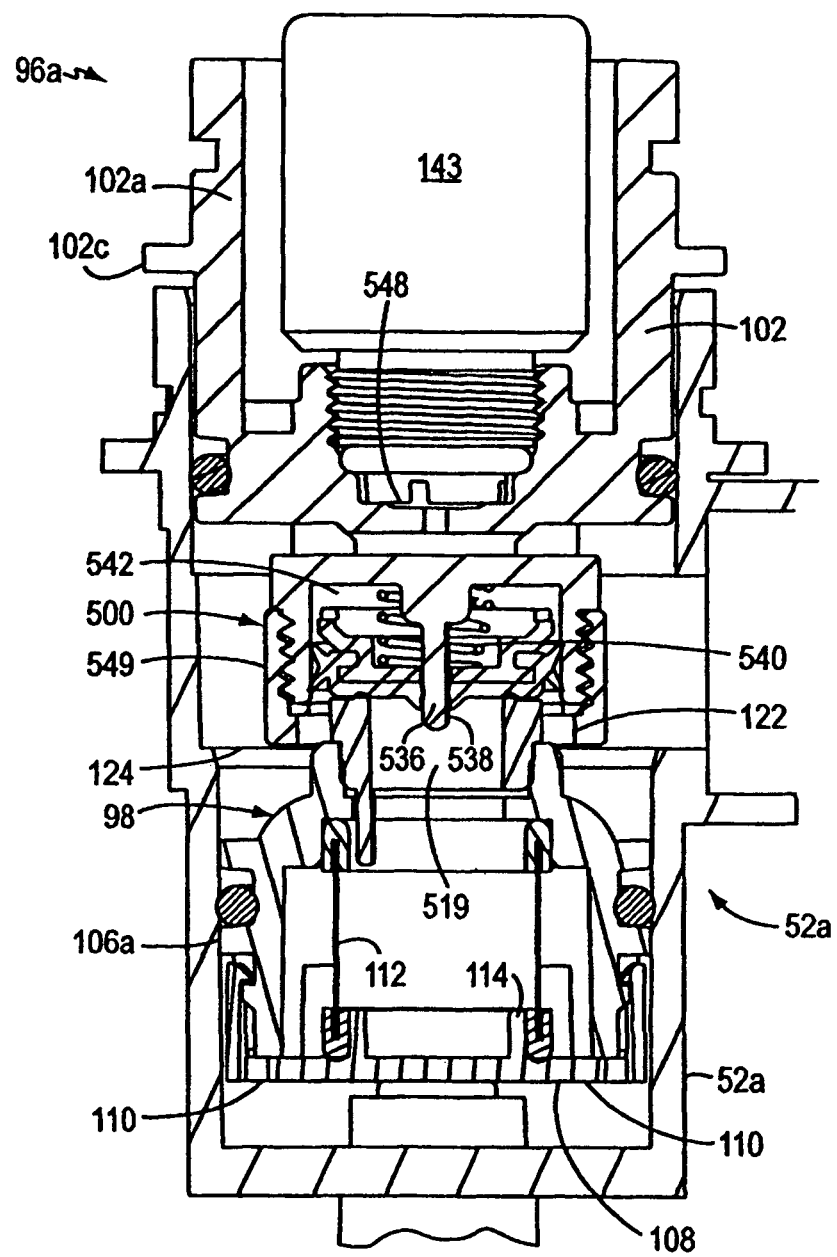
FIG. 4A is a fragmentary sectional view of a portion of the faucet shown in FIG. 2A.
Figure 5:
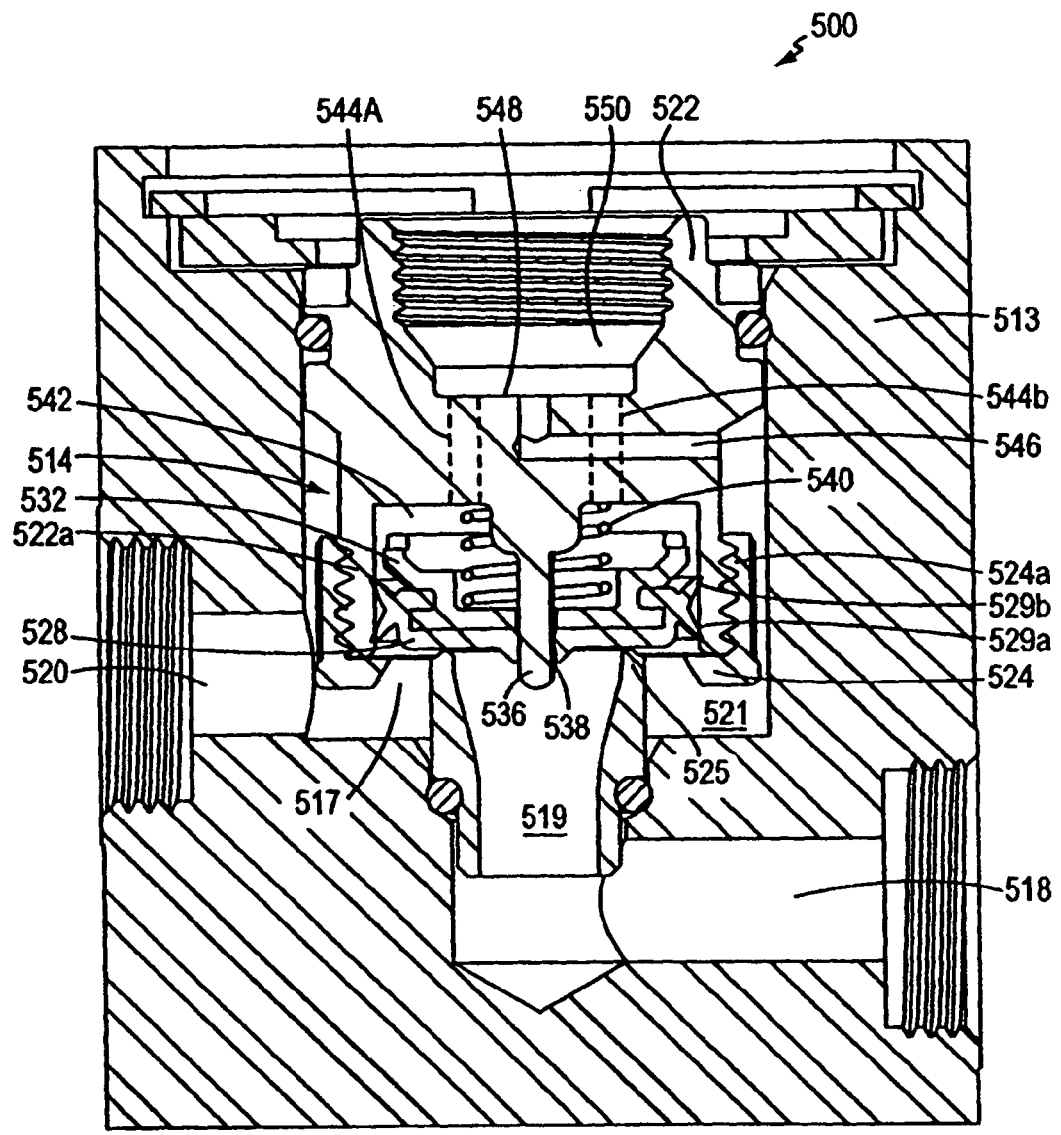
FIG. 5 is an enlarged sectional view of a valve for controlling fluid flow in the faucet shown in FIGS. 2A and 4A.
Figure 6A:
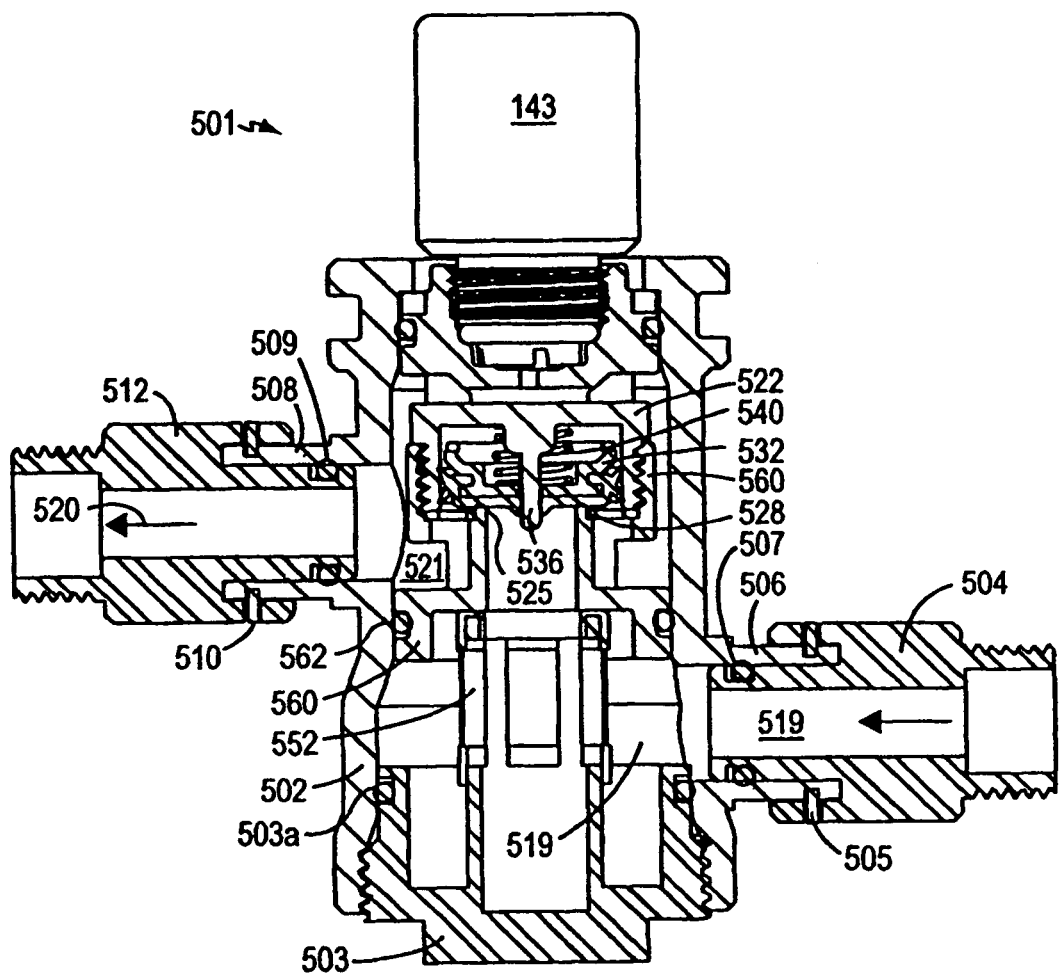
FIG. 6A is an enlarged sectional view of the valve device shown in FIG. 6.
Figure 6B:
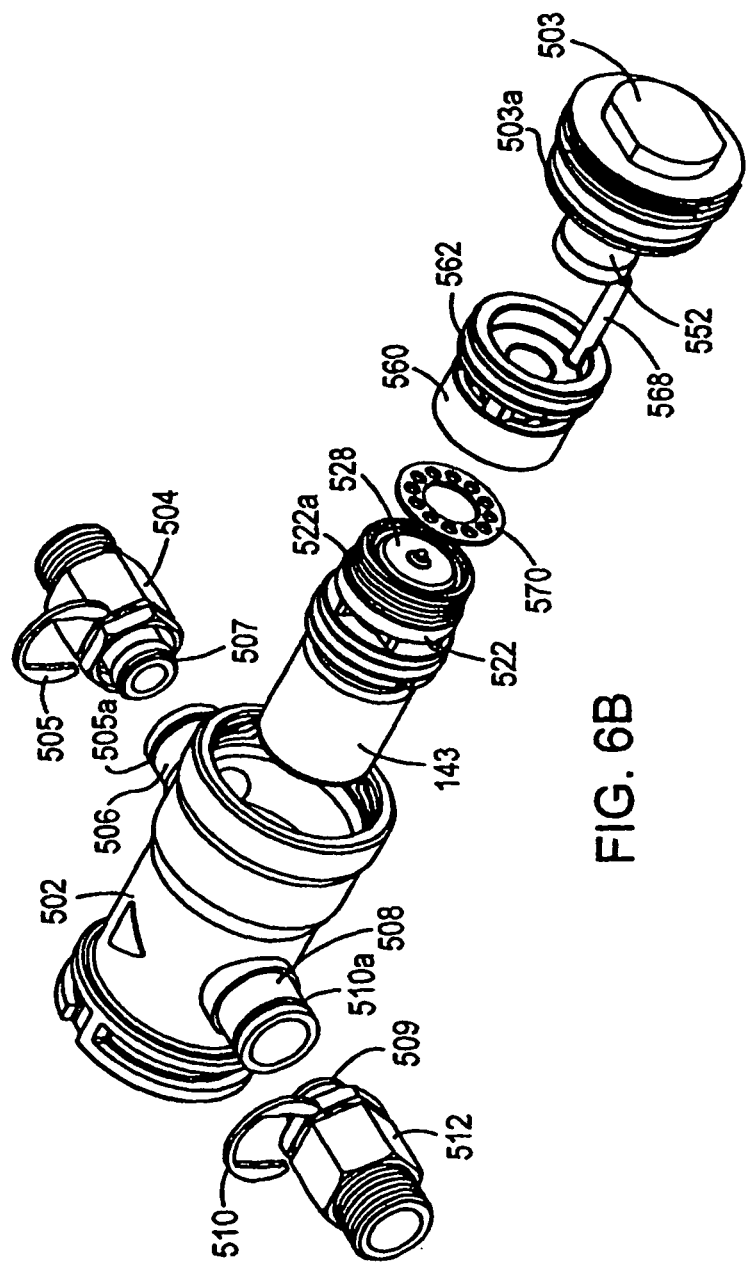
FIG. 6B is a perspective exploded view of the valve device shown in FIG. 6A.

FIG. 5 illustrates a preferred embodiment of a valve 500 used in the faucet embodiment shown in FIGS. 2A and 4A, and in the faucet embodiment shown in FIGS. 6, 6A and 6B. In general, valve device 10 includes an input port and an output port both in communication with a fram member constructed and arranged to open or dose fluid flow between the two fluid ports. The design of the fram member enables a relatively high flow rate between the input port and the output port, when compared to a prior art diaphragm valves of similar dimensions.

The operation of the fram member is controlled by an actuator that may include an electromagnetic solenoid. Valve 10 may also include a manual actuator constructed to control the operation of the fram member independently of the electromagnetic solenoid. The manual actuator may be connected to a separate manual port or to the same port as the solenoid. For example, the manual actuator may be used to control the operation of the fram member when loss of electrical power or other failure disables the automatic actuator.

Figure 5A:
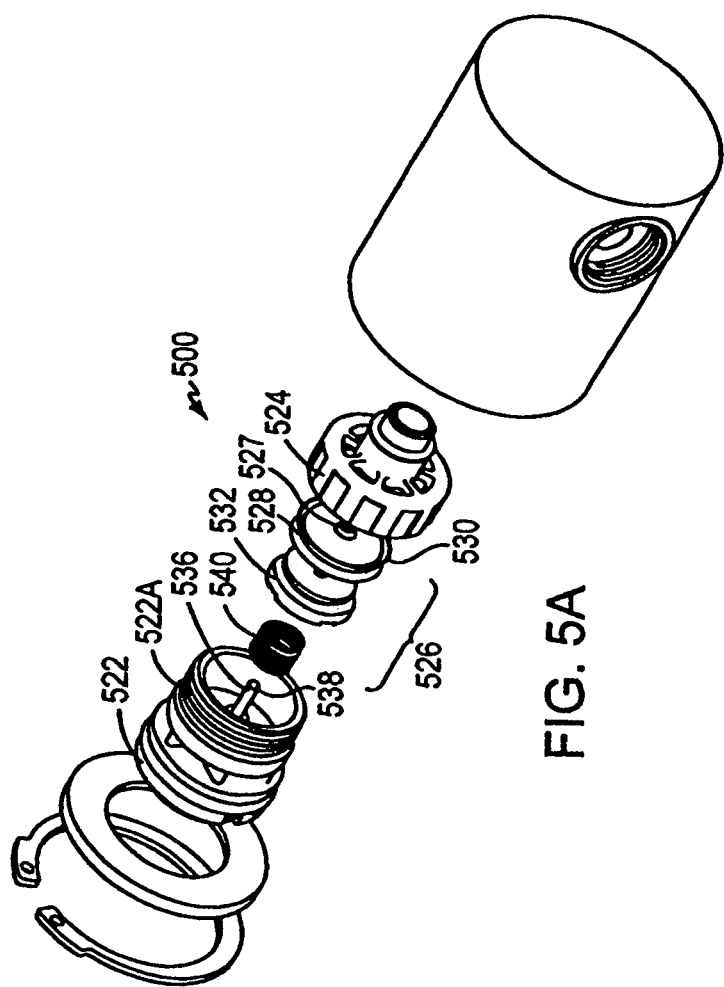
FIG. 5A is a perspective exploded view of the valve shown in FIG. 5.

Valve device 500 includes a valve body 513 providing a cavity for a valve assembly 514, an input port 518, and an output port 520. Valve assembly 514 includes a proximal body 522, a distal body 524, and a fram member 526 (FIG. 5A). Fram member 526 includes a pliable member 528 and a support member 532. Pliable member 528 may be a diaphragm-like member with a sliding seal 530. Support member 532 may be plunger-like member or a piston like member, but having a different structural and functional properties that a conventional plunger or piston. Valve assembly 514 also includes a guiding member such as a guide pin 536 or sliding surfaces, and includes a spring 540.

Proximal body 522 includes threaded surface 522A cooperatively sized with threaded surface 524A of distal body 524. Fram member 526 (and thus pliable member 528 and a plunger-like member 532) include an opening 527 constructed and arranged to accommodate guiding pin 536. Fram member 526 defines a pilot chamber 542 arranged in fluid communication with actuator cavity 550 via control passages 544A and 544B. Actuator cavity 550 is in fluid communication with output port 520 via a control passage 546. Guide pin 536 includes a V-shaped or U-shaped groove 538 shaped and arranged together with fram opening 527 (FIG. 5A) to provide a pressure communication passage between input chamber 519 and pilot chamber 550.

Referring still to FIG. 5, distal body 524 includes an annular lip seal 525 arranged, together with pliable member 528, to provide a seal between input port chamber 529 and output port chamber 521. Distal body 524 also includes one or several flow channels 517 providing communication (in open state) between input chamber 519 and output chamber 521. Pliable member 528 also includes sealing members 529A and 529B arranged to provide a sliding seal, with respect to valve body 522, between pilot chamber 42 and output chamber 521. There are various possible embodiments of seals 529A and 529B (FIG. 5). This seal may be one-sided as seal 530 (shown in FIG. 5A) or two-sided seal 529a and 529b shown in FIG. 5. Furthermore, there are various additional embodiments of the sliding seal including O-ring etc.

The present invention envisions valve device 10 having various sizes. For example, the "full" size embodiment, shown in FIG. 2, has the pin diameter A=0.070", the spring diameter B=0.360", the pliable member diameter C=0.730", the overall fram and seal's diameter D=0.812", the pin length E=0.450", the body height F=0.380", the pilot chamber height G=0.280", the fram member size H=0.160", and the fram excursion I=0.100". The overall height of the valve is about 1.39" and diameter is about 1.178".

The "half size" embodiment (of the valve shown in FIG. 2) has the following dimensions provided with the same reference letters (each also including a subscript 1) shown in FIG. 2. In the "half size" valve $A_1$=0.070", $B_1$=0.30, $C_1$=0.560", $D_1$=0.650", $E_1$=0.38", $F_1$=0.310", $G_1$=0.215", $H_1$=0.125", and $I_1$=0.60". The overall length of the ½ embodiment is about 1.350" and the diameter is about 0.855". Similarly, the valve devices of FIG. 5B or 5C may have various larger or smaller sizes.

Figure 5B:
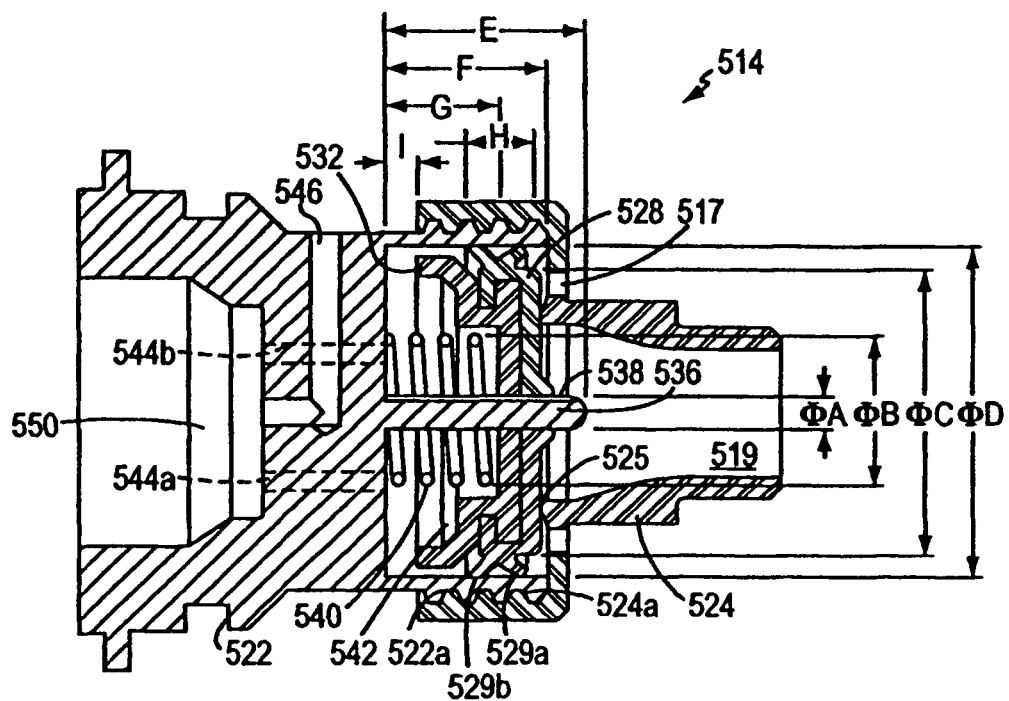
FIG. 5B is an enlarged sectional view of another embodiment of the valve shown in FIG. 5.

Referring to FIGS. 5 and 5B, valve 500 receives fluid at input port 518, which exerts pressure onto diaphragm-like members 528 providing a seal together with a lip member 525 in a closed state. Groove passage 538 provides pressure communication with pilot chamber 542, which is in communication with actuator cavity 550 via communication passages 544A and 544B. An actuator (shown in FIGS. 4A. 5C) provides a seal at surface 548 thereby sealing passages 544A and 544B and thus pilot chamber 542. When the plunger of actuator 142 or 143 moves away from surface 548, fluid flows via passages 544A and 544B to control passage 546 and to output port 520. This causes pressure reduction in pilot chamber 542. Therefore, diaphragm-like member 528 and piston-like member 532 move linearly within cavity 542, thereby providing a relatively large fluid opening at lip seal 525. A large volume of fluid can flow from input port 518 to output port 520.

When the plunger of actuator 142 or 143 seals control passages 544A and 544B, pressure builds up in pilot chamber 542 due to the fluid flow from input port 518 through groove 538. The increased pressure in pilot chamber 542 together with the force of spring 540 displace linearly, in a sliding motion over guide pin 536, fram member 526 toward sealing lip 529. When there is sufficient pressure in pilot chamber 542, diaphragm-like pliable member 528 seals input port chamber 519 at lip seal 525. Preferably, soft member 528 is designed to dean groove 538 of guide pin 536 during the sliding motion.

The embodiment of FIG. 5 shows valve 500 having input chamber 519 (and guide pin 536) symmetrically arranged with respect to passages 544A, 544B and 546 (and the location of the plunger of actuator 142 or 143). However, valve device 500 may have input chamber 519 (and guide pin 536) non-symmetrically arranged with respect to passages 544A, 544B (not shown) and passage 546. That is, this valve has input chamber 519 (and guide pin 536) non-symmetrically arranged with respect to the location of the plunger of actuator 142 or 143. The symmetrical and non-symmetrical embodiments are equivalent.

Figure 5C:
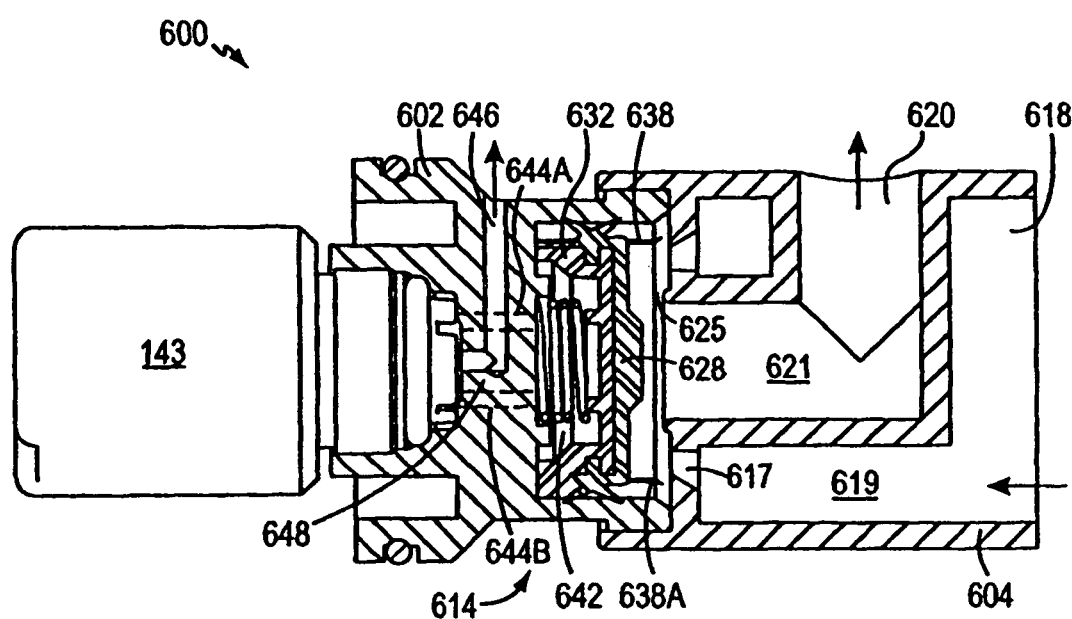
FIG. 5C is an enlarged sectional view of another embodiment of the valve shown in FIG. 5.

Referring to FIG. 5C, valve device 600 includes a valve body 613 providing a cavity for a valve assembly 614, an input port 618, and an output port 620. Valve assembly 614 includes a proximal body 602, a distal body 604, and a fram member or assembly 626. Fram member 626 includes a pliable member 628 and a support member 632. Pliable member 628 may be a diaphragm-like member with a sliding seal 630. Support member 632 may be plunger-like member or a piston like member, but having a different structural and functional properties that a conventional plunger or piston. Valve body 602 provides a guide surface 636 located on the inside wall that includes one or several grooves 638 and 638A. These are novel grooves constructed to provide fluid passages from input chamber located peripherally (unlike the central input chamber shown in FIGS. 5 and 5B).

Fram member 626 defines a pilot chamber 642 arranged in fluid communication with actuator cavity 650 via control passages 644A and 644B. Actuator cavity 650 is in fluid communication with output chamber 621 via a control passage 646. Groove 638 (or grooves 638 and 638A) provides a communication passage between input chamber 619 and pilot chamber 642. Distal body 604 includes an annular lip seal 625 co-operatively arranged with pliable member 628 to provide a seal between input port chamber 619 and output port chamber 621. Distal body 624 also includes a flow channel 617 providing communication (in the open state) between input chamber 619 and output chamber 621 for a large amount of fluid flow. Pliable member 628 also includes sealing members 629A and 629B (or one sided sealing member depending on the pressure conditions) arranged to provide a sliding seal with respect to valve body 622, between pilot chamber 642 and input chamber 619. (Of course, groove 638 enables a controlled flow of fluid from input chamber 619 to pilot chamber 642, as described above.)

The entire operation of valve device 600 is controlled by a single actuator 142 or 143, which may include a solenoid, such as the bistable solenoid model no. AXB724 available from Arichell Technologies Inc., West Newton, Mass. Alternatively, actuator 142 may include a latching actuator (as described in U.S. Pat. No. 6,293,516, which is incorporated by reference), a non-latching actuator (as described in U.S. Pat. No. 6,305,662, which is incorporated by reference), or an isolated operator 143 (as described in PCT Application PCT/US01/51098, which is incorporated by reference). In general, a number of solenoid valves may be used such as described in U.S. Pat. No. 4,225,111. An alternative bistable solenoid is described in U.S. Pat. No. 5,883,557 or U.S. Pat. No. 5,599,003.

Advantageously, valves 500 and 600 provide much higher flow rates than flow rates of prior art diaphragm valves. Furthermore, valves 500 and 600 have a more predictable operation than standard piston valves. Curve 160 depicts a flow-rate (in gallons per minute) for a prior art diaphragm valve for water pressures from about 6 psi to about 92 psi. Curve 162 depicts the flow-rate (in gallons per minute) through the "half size" valve of FIG. 1 for water pressures from about 6 psi to about 97 psi. Curve 164 depicts a flow-rate (in gallons per minute) through the "two size" valve of FIG. 1 for water pressures from about 6 psi to about 42 psi. In summary, the novel valve enables about three or four times higher flow-rate than prior art diaphragm valves due to its larger stroke of the fram member.

FIG. 6 illustrates another embodiment of an automatic faucet mounted to a countertop 12. The automatic faucet includes hot and cold water lines 24a and 24b, respectively, connected to a mixing valve 25, which in turn is connected to an automatic valve device 501, shown in detail in FIGS. 6A and 6B. Automatic valve device 501 includes control circuitry (shown in FIG. 8 or 9) constructed and arranged to control water flow based on signals received from either a transceiver for detecting presence of an object, or a proximity sensor. A suitable optical transceiver is described in U.S. Pat. No. 5,979,500 or U.S. Pat. No. 5,984,262, both of which are incorporated by reference.

Automatic valve device 501 receives water input from a mixing valve 25 and provides controlled water output to the faucet outlet 44. Automatic valve device 501 includes, valve body 502 coupled to an input connector 504, and an output connector 512. Valve body 502 includes a valve 500 (described in connection with FIGS. 5, 5A and 5B) and a removable plug 503. The operation of automatic valve device 501 is controlled by actuator 142 or actuator 143 (described in detail in connection with FIGS. 7 through 7F). Preferably, actuator 142 or 143 is screwed to the body of valve 500. The entire geometry and design of automatic valve device 501 is arranged for easy access and servicing. Specifically, after removal of plug 503, the entire valve assembly including actuator 142 or 143 can be pulled out of valve body 502 by pulling on a removal rod 568, as shown in FIG. 6B.

Referring still to FIGS. 6, 6A and 6B, automatic valve device 501 includes a body 502 made of a durable plastic or metal. Preferably, valve body 502 is made of a plastic material but includes a metallic input coupler 504 and a metallic output coupler 512. Input and output couplers 504 and 512 are made of metal, as known in the industry, so that they can be used as gripping surfaces for a wrench used to connect them to a water line leading to faucet output 44.

Due to its softer body, automatic valve device 501, includes input and output couplers having a unique design that prevents tightening the water line connection to any of the two valve couplers unless attaching the wrench on the surface of couplers 504 and 512. (That is, a plumber cannot tighten the waterlines by gripping on the valve body 502.) Specifically, coupler 504 is rotatably attached to the valve input port 506 using a sealing O-ring 507 and a C-clamp 505 that fits into a groove 505a. Similarly, output coupler 512 is rotatably connected to output port 508 of valve 502. This rotatable coupling is again achieved by using an O-ring 509 and a C-clamp 510 that slides into a slot 510a. Therefore, due to the rotational movement, it is not possible to tighten the input and output water lines by gripping onto plastic body 502. This, in turn, protects the relatively soft plastic from being destroyed during installation.

Referring to FIG. 6B, a valve device 501 is assembled by installing an actuator 142 or 143 (with or without piloting button 705) onto valve body 522. Valve body 522 is tightened using threads 522a inside body 560 also including the fram member with pliable member 528 (shown in FIG. 6B). Automatic valve 501 also includes output port member 570 with several orifices providing passages to output 520, similarly as done by distal body 524 shown in FIG. 5A. After the individual valve pieces are tightened together the entire assembly is inserted inside valve body 502 and dosed by distal plug 503, including O-ring 503a, after water filter 552 is also inserted.

As described above, service rod 568 is designed to pull the entire valve assembly out of body 502, after removing of plug 503. The removal of the entire valve assembly also removes the attached actuator 143 and piloting button 705. To enable easy installation and servicing, there are rotational electrical contacts located on a PCB at the distal end. Specifically, actuator 143 includes, on its distal end, two annular contact regions that provide a contact surface for the corresponding pins, all of which can be gold plated for achieving high quality contacts. Alternatively, a stationary PCB can include the two annular contact regions and the actuator may be connected to movable contact pins. Such distal, actuator contact assembly achieves easy rotational contacts by just sliding actuator 143 inside valve body 502.

Figure 7:
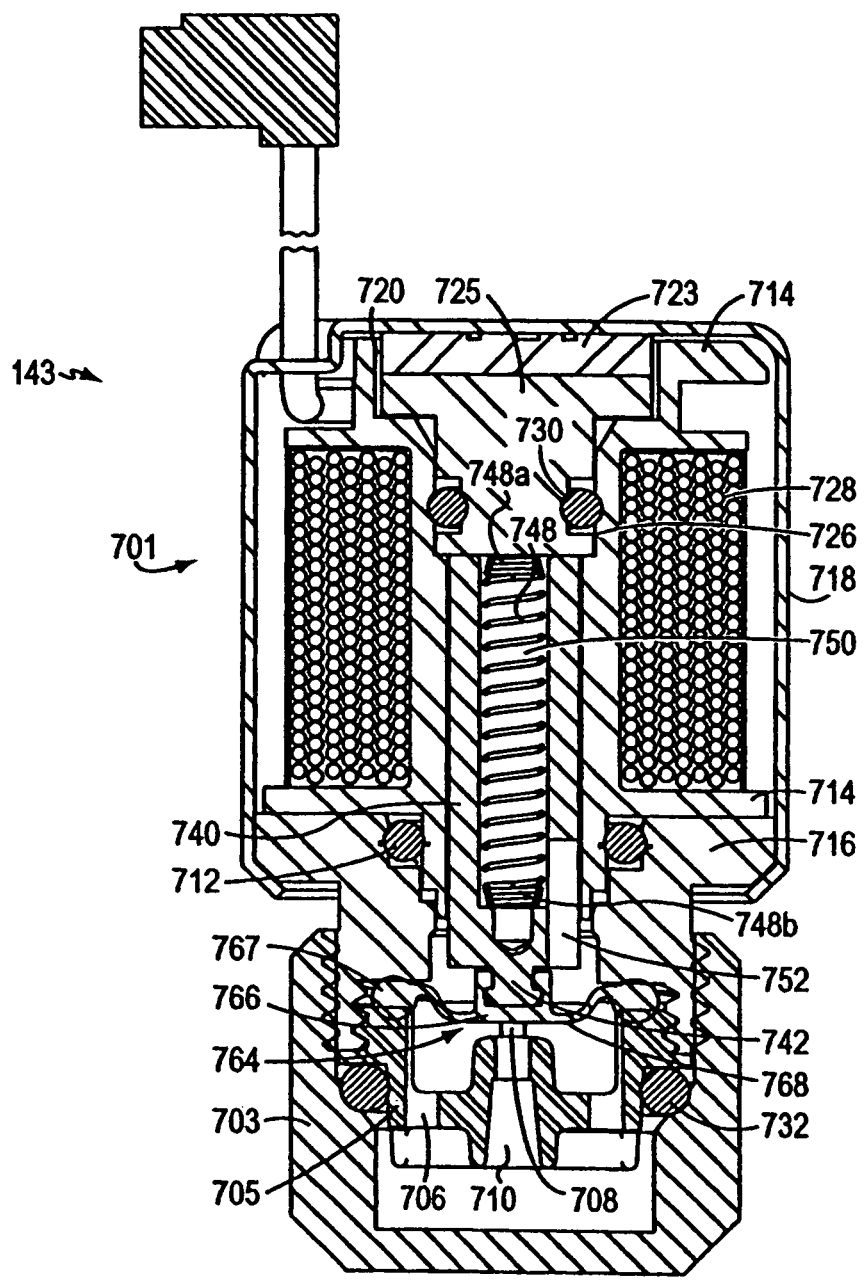
FIG. 7 is a sectional view of a first embodiment of an electromechanical actuator for controlling any one of the valves shown in FIGS. 5 through 6B.
Figure 7A:
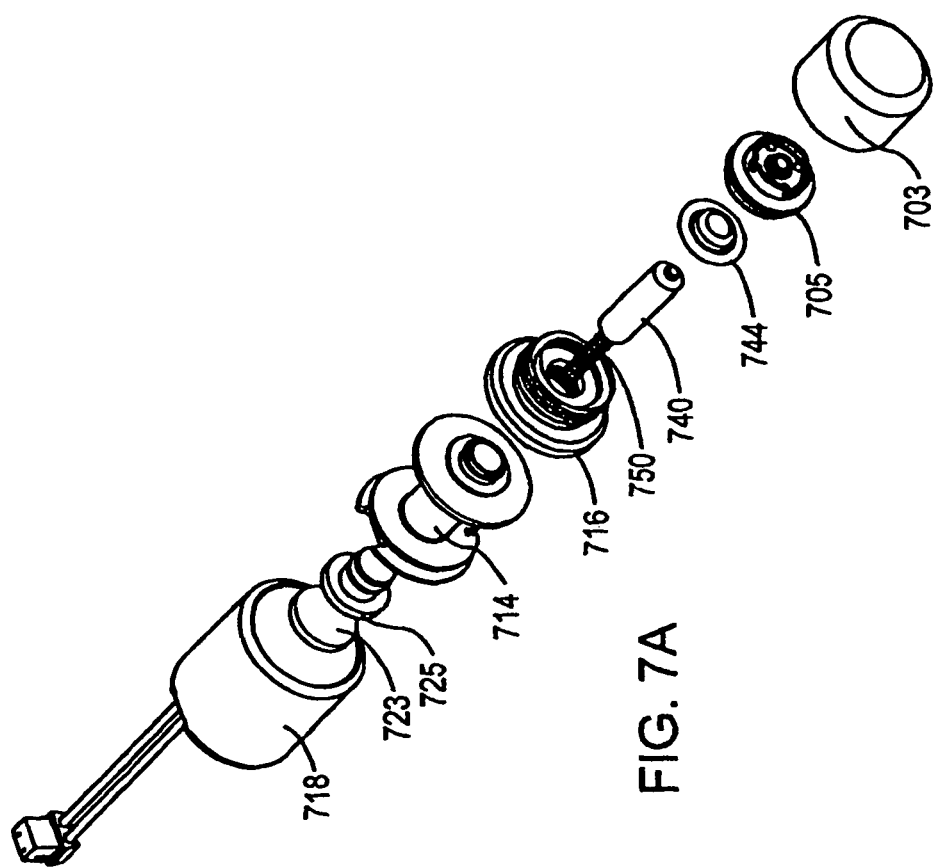
FIG. 7A is a perspective exploded view of the electromechanical actuator shown in FIG. 7
Figure 7B:
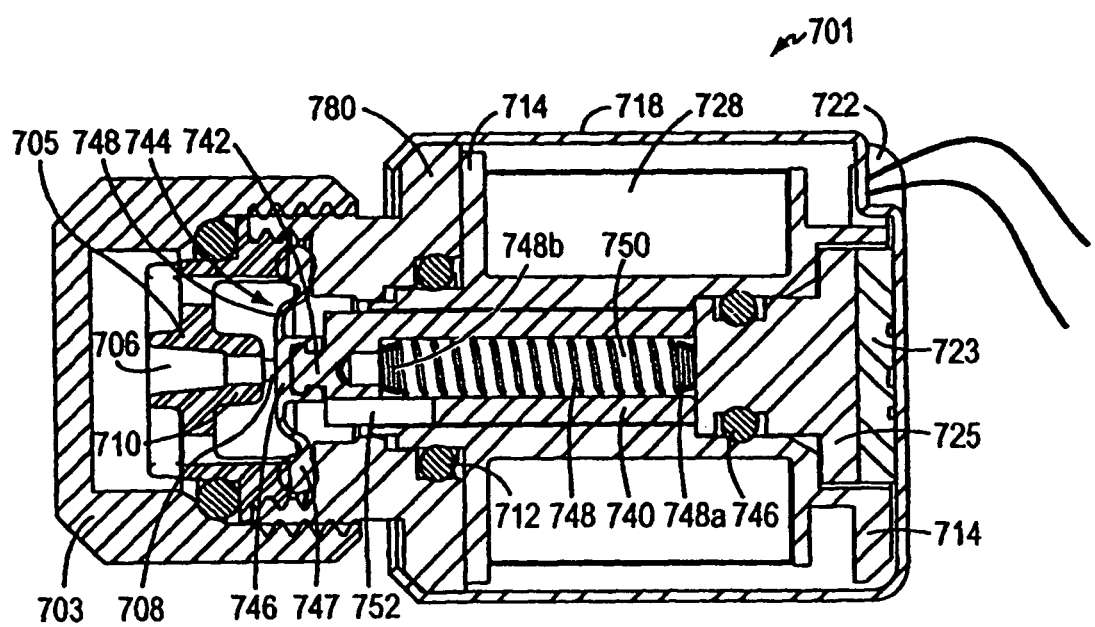
FIG. 7B is a sectional view of a second embodiment of an electromechanical actuator for controlling the valves shown in FIGS. 5 through 6B.
Figure 7C:
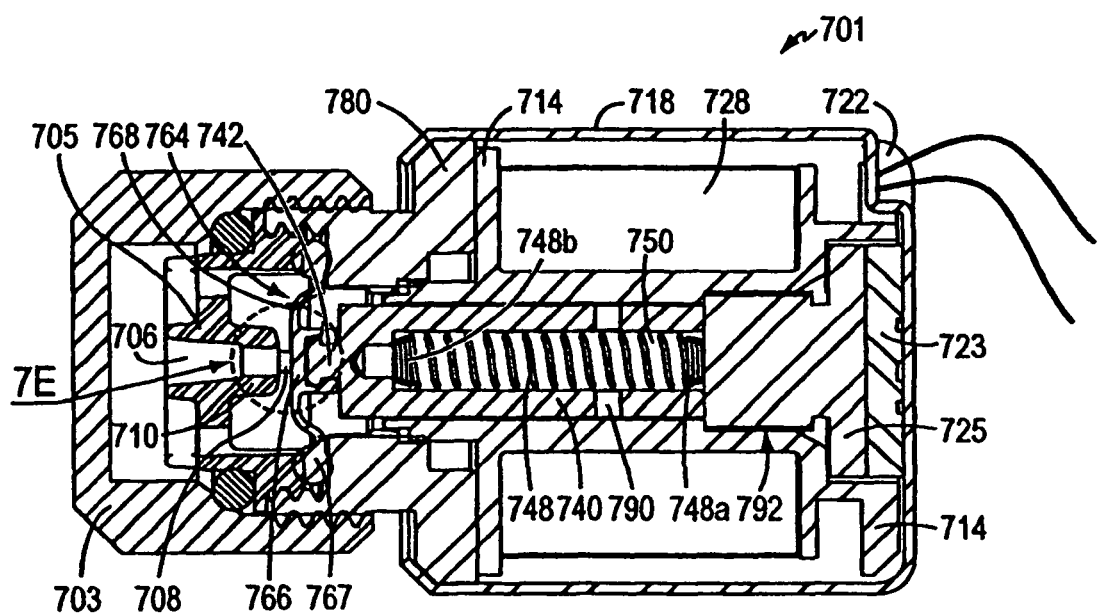
FIG. 7C is a sectional view of a third embodiment of an electromechanical actuator for controlling the valves shown in FIGS. 5 through 6B.

Electronic faucets shown in FIGS. 2, 2A, and 6 may utilize various embodiments of isolated actuator 143, shown in FIGS. 7, 7B and 7C. Isolated actuator 143 includes actuator body 701 comprising an actuator base 716, a ferromagnetic pole piece 725, a ferromagnetic armature 740 slideably mounted in an armature pocket formed inside a bobbin 714. Ferromagnetic armature 740 includes a distal end 742 (i.e., plunger 742) and an armature cavity 750 having a coil spring 748. Coil spring 748 includes reduced ends 748a and 748b for machine handling. Ferromagnetic armature 740 may include one or several grooves or passages 752 providing communication from the distal end of armature 740 (outside of actuator base 716) to armature cavity 750 and to the proximal end of armature 740, at the pole piece 725, for easy movement of fluid during the displacement of the armature.

Isolated actuator body 701 also includes a solenoid windings 728 wound about solenoid bobbin 714 and magnet 723 located in a magnet recess 720. Isolated actuator body 701 also includes a resiliently deformable O-ring 712 that forms a seal between solenoid bobbin 714 and actuator base 716, and includes a resiliently deformable O-ring 730 that forms a seal between solenoid bobbin 714 and pole piece 725, all of which are held together by a solenoid housing 718. Solenoid housing 718 (i.e., can 718) is crimped at actuator base 16 to hold magnet 723 and pole piece 725 against bobbin 714 and thereby secure windings 728 and actuator base 716 together.

Isolated actuator 143 also includes a resilient membrane 744 that may have various embodiments shown and described in connection with FIGS. 7D and 7E. As shown in FIG. 7, resilient membrane 764 is mounted between actuator base 716 and a piloting button 705 to enclose armature fluid located a fluid-tight armature chamber in communication with an armature port 752. Resilient membrane 764 includes a distal end 766, O-ring like portion 767 and a flexible portion 768. Distal end 766 comes in contact with the sealing surface in the region 708. Resilient membrane 764 is exposed to the pressure of regulated fluid provided via conduit 706 in piloting button 705 and may therefore be subject to considerable external force. Furthermore, resilient membrane 764 is constructed to have a relatively low permeability and high durability for thousands of openings and closings over many years of operation.

Referring to still to FIG. 7, isolated actuator 143 is provided, for storage and shipping purposes, with a cap 703 sealed with respect to the distal part of actuator base 716 and with respect to piloting button 705 using a resiliently deformable O-ring 732. Storage and shipping cap 703 includes usually water that counter-balances fluid contained by resilient membrane 744; this significantly limits or eliminates diffusion of fluid through resilient membrane 744.

Isolated actuator 143 may be constructed either as a latching actuator (shown in FIG. 7) or a non-latching actuator. The latching embodiment includes magnet 723 (as shown) providing magnetic field having orientation and force sufficient to overcome the force of coil spring 748 and thereby retain armature 740 in the open state even after there is no drive current flowing in the solenoid's windings 728.

In the non-latching embodiment, there is no permanent magnet (i.e., no magnet 732). Thus, to keep armature 740 in the open state, a drive current must continue to flow in windings 728 to provide the necessary magnetic field. Armature 740 moves to the dosed state under the force of spring 48 if there is no drive current. On the other hand, in the latching embodiment, a drive current is applied to windings 728 in opposite directions to move armature 730 between the open and closed states, but no drive current is necessary to maintain either state.

Referring still to FIG. 7, actuator base 716 includes a wide base portion substantially located inside can 718 and a narrowed base extension threaded on its outer surface to receive cap 703. The inner surface of the base extension threadedly engages complementary threads provided on the outer surface of piloting button 705. Membrane 764 includes a thickened peripheral rim 767 located between the base extension 32's lower face and piloting button 705. This creates a fluid-tight seal so that the membrane protects the armature from exposure to external fluid flowing in the main valve.

For example, the armature liquid may be water mixed with a corrosion inhibitor, e.g., a 20% mixture of polypropylene glycol and potassium phosphate. Alternatively, the armature fluid may include silicon-based fluid, polypropylene polyethylene glycol or another fluid having a large molecule. The armature liquid may in general be any substantially non-compressible liquid having low viscosity and preferably non-corrosive properties with respect to the armature. Alternatively, the armature liquid may be Fomblin or other liquid having low vapor pressure (but preferably high molecular size to prevent diffusion).

If there is anticorrosive protection, the armature material can be a low-carbon steel, iron or any soft magnetic material; corrosion resistance is not as big a factor as it would otherwise be. Other embodiments may employ armature materials such as the 420 or 430 series stainless steels. It is only necessary that the armature consist essentially of a ferromagnetic material, i.e., a material that the solenoid and magnet can attract. Even so, it may include parts, such as, say, a flexible or other tip, that is not ferromagnetic.

Resilient membrane 764 encloses armature fluid located a fluid-tight armature chamber in communication with an armature port 752 or 790 formed by the armature body. Furthermore, resilient membrane 764 is exposed to the pressure of regulated fluid in main valve and may therefore be subject to considerable external force. However, armature 740 and spring 750 do not have to overcome this force, because the conduit's pressure is transmitted through membrane 764 to the incompressible armature fluid within the armature chamber. The force that results from the pressure within the chamber therefore approximately balances the force that the conduit pressure exerts.

Referring still to FIGS. 7, 7A, 7B and 7C, armature 740 is free to move with respect to fluid pressures within the chamber between the retracted and extended positions. Armature port 752 or 790 enables the force-balancing fluid displaced from the armature chamber's lower well through the spring cavity 750 to the part of the armature chamber from which the armature's upper end (i.e. distal end) has been withdrawn upon actuation. Although armature fluid can also flow around the armature's sides, arrangements in which rapid armature motion is required should have a relatively low-flow-resistance path such as the one that port 752 or 790 helps form. Similar considerations favor use of an armature-chamber liquid that has relatively low viscosity. Therefore, the isolated operator (i.e., actuator 143) requires for operation only low amounts of electrical energy and is thus uniquely suitable for battery operation.

In the latching embodiment shown in FIG. 7, armature 740 is held in the retracted position by magnet 723 in the absence of a solenoid current. To drive the armature to the extended position therefore requires armature current of such a direction and magnitude that the resultant magnetic force counteracts that of the magnet by enough to allow the spring force to prevail. When it does so, the spring force moves armature 740 to its extended position, in which it causes the membrane's exterior surface to seal against the valve seat (e.g., the seat of piloting button 705). In this position, the armature is spaced enough from the magnet that the spring force can keep the armature extended without the solenoid's help.

To return the armature to the illustrated, retracted position and thereby permit fluid flow, current is driven through the solenoid in the direction that causes the resultant magnetic field to reinforce that of the magnet. As was explained above, the force that the magnet 723 exerts on the armature in the retracted position is great enough to keep it there against the spring force. However, in the non-latching embodiment that doesn't include magnet 723, armature 740 remain in the retracted position only so long as the solenoid conducts enough current for the resultant magnetic force to exceed the spring force of spring 748.

Advantageously, diaphragm membrane 764 protects armature 740 and creates a cavity that is filled with a sufficiently non-corrosive liquid, which in turn enables actuator designers to make more favorable choices between materials with high corrosion resistance and high magnetic permeability. Furthermore, membrane 764 provides a barrier to metal ions and other debris that would tend to migrate into the cavity.

Diaphragm membrane 764 includes a sealing surface 766, which is related to the seat opening area, both of which can be increased or decreased. The sealing surface 766 and the seat surface of piloting button 705 can be optimized for a pressure range at which the valve actuator is designed to operate. Reducing the sealing surface 766 (and the corresponding tip of armature 740) reduces the plunger area involved in squeezing the membrane, and this in turn reduces the spring force required for a given upstream fluid-conduit pressure. On the other hand, making the plunger tip area too small tends to damage diaphragm membrane 764 during valve dosing over time. Preferable range of tip-contact area to seat-opening area is between 1.4 and 12.3. The present actuator is suitable for variety of pressures of the controlled fluid. including pressures about 150 psi. Without any substantial modification, the valve actuator may be used in the range of about 30 psi to 80 psi, or even water pressures of about 125 psi.

Referring still to FIGS. 7, 7A, 7B and 7C, piloting button 705 has an important novel function for achieving consistent long-term piloting of the diaphragm valve shown in FIG. 4, or the fram valve shown in FIG. 4A. Solenoid actuator 142 or 143 together with piloting button 705 are installed together as one assembly into the electronic faucet; this minimizes the pilot-valve-stroke variability at the pilot seat in region 708 (FIGS. 7, 7B and 7C) with respect to the closing surface (shown in detail in FIG. 7E), which variability would otherwise afflict the piloting operation. This installation is faster and simpler than prior art installations.

The assembly of operator 701 and piloting button 705 is usually put together in a factory and is permanently connected thereby holding diaphragm membrane 764 and the pressure loaded armature fluid (at pressures comparable to the pressure of the controlled fluid). Piloting button 705 is coupled to the narrow end of actuator base 716 using complementary threads or a sliding mechanism, both of which assure reproducible fixed distance between distal end 766 of diaphragm 764 and the sealing surface of piloting button 705. The coupling of operator 701 and piloting button 705 can be made permanent (or rigid) using glue, a set screw or pin. Alternatively, one member may include an extending region that is used to crimp the two members together after screwing or sliding on piloting button 705.

It is possible to install solenoid actuator 142 or 143 without piloting button 705, but this process is somewhat more cumbersome. Without piloting button 705, the installation process requires first positioning the pilot-valve body (102*d* in FIG. 4, or 514 in FIGS. 4A and 5) with respect to the main valve and then securing to the actuator assembly onto the main valve as to hold the pilot-valve body in place. If proper care is not taken, there is some variability in the position of the pilot body due to various piece-part tolerances and possible deformation. This variability creates variability in the pilot-valve member's stroke. In a low-power pilot valve, even relatively small variations can affect timing or possibly sealing force adversely and even prevent the pilot valve from opening or closing at all. Thus, it is important to reduce this variability during installation, field maintenance, or replacement. On the other hand, when assembling solenoid actuator 142 or 143 with piloting button 705, this variability is eliminated or substantially reduced during the manufacturing process, and thus there is no need to take particular care during field maintenance or replacement.

Referring to FIG. 7, thus piloting button 705 enables a novel way of assembling a pilot-valve-operated automatic flow controller, used in the faucet embodiments of FIGS. 2 and 2A, that achieves a consistent long-term performance. The novel method of assembling a pilot-valve-operated automatic flow controller includes providing a main valve assembly (e.g., valve assembly 96 shown in FIG. 4 without using actuator 142; or a valve assembly 96*s* shown in FIG. 4A without using actuator 143) and a pilot-valve assembly 143 (FIG. 7) including stationary actuator 701 and piloting button 703 (i.e., pilot body member) that includes pilot-valve inlet 706, a pilot-valve seat located at 708, and a pilot-valve outlet 710. The assembly method includes securing the pilot-valve assembly to the main valve assembly in a way that fluid flowing from the pressure-relief outlet (e.g., passage 136*a* in FIG. 4 or passages 544*a* and 544*b* in FIG. 5) of the main valve must flow through pilot-valve inlet 706, past the pilot-valve seat, and through pilot-valve outlet 710, whereby the pilot-valve assembly is positioned to control relief of fluid pressure in the pressure chamber (i.e., pilot chamber 132 in FIG. 4, or pilot chamber 542 in FIG. 4A) of the main valve assembly.

As described above, the main valve assembly includes a main valve body with a main-valve inlet, a main-valve seat, a main-valve outlet, a pressure chamber (i.e., a pilot chamber), and a pressure-relief outlet through which the pressure in the pressure chamber (pilot chamber) can be relieved, wherein the main valve member can be diaphragm 126 (FIG. 4), a piston, or a fram member 526 (FIG. 5A), all of which are movable between a closed position, in which the main valve member seals against the main-valve seat (i.e., circular seat 124 in FIG. 4, or circular seat 525 in FIG. 5) thereby preventing flow from the main inlet (e.g., input port 518 in FIG. 5) to the main outlet (e.g., output port 520 in FIG. 5).

Figure 7D:
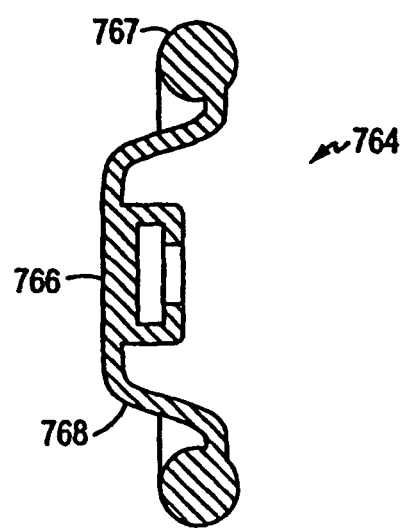
FIG. 7D is a sectional view of another embodiment of a membrane used in the actuator shown in FIGS. 7 through 7C.
Figure 7E:
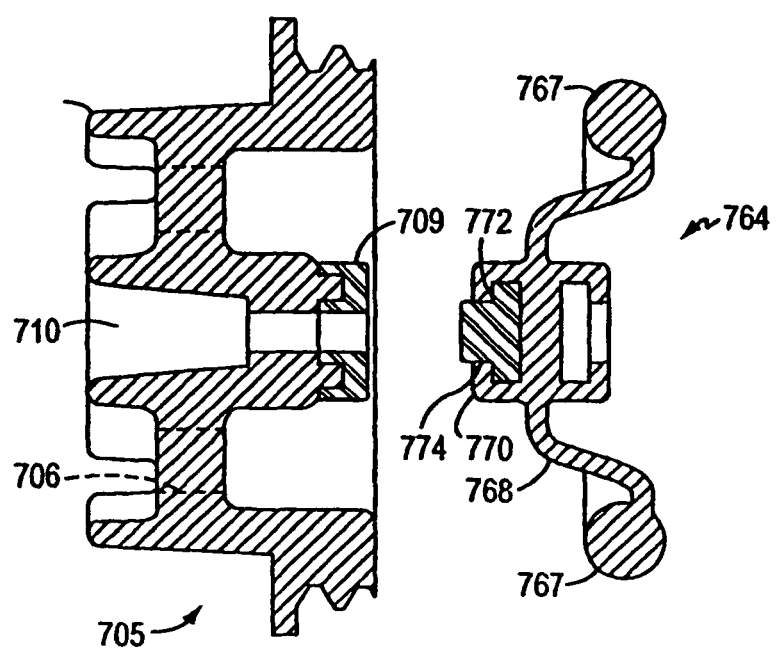
FIG. 7E is a sectional view of another embodiment of the membrane and a piloting button used in the actuator shown in FIGS. 7 through 7C.

Referring to FIGS. 7D and 7E, as described above, diaphragm membrane 764 includes an outer ring 767, flex region 768 and tip or seat region 766. The distal tip of the plunger is enclosed inside a pocket flange behind the sealing region 766. Preferably, diaphragm membrane 764 is made of EPDM due to its low durometer and compression set by NSF part 61 and relatively low diffusion rates. The low diffusion rate is important to prevent the encapsulated armature fluid from leaking out during transportation or installation process. Alternatively, diaphragm member 764 can be made out of a flouro-elastomer, e.g., VITON, or a soft, low compression rubber, such as CRI-LINE® flouro-elastomer made by CRI-TECH SP-508. Alternatively, diaphragm member 764 can be made out of a Teflon-type elastomer, or just includes a Teflon coating. Alternatively, diaphragm member 764 can be made out NBR (natural rubber) having a hardness of 40-50 durometer as a means of reducing the influence of molding process variation yielding flow marks that can form micro leaks of the contained fluid into the surrounding environment. Alternatively, diaphragm member 764 includes a metallic coating that slows the diffusion thru the diaphragm member when the other is dry and exposed to air during storage or shipping of the assembled actuator.

Preferably, diaphragm member 764 has high elasticity and low compression (which is relatively difficult to achieve). Diaphragm member 764 may have some parts made of a low durometer material (i.e., parts 767 and 768) and other parts of high durometer material (front surface 766). The low compression of diaphragm member 764 is important to minimize changes in the armature stroke over a long period of operation. Thus, contact part 766 is made of high durometer material. The high elasticity is needed for easy flexing diaphragm member 764 in regions 768. Furthermore, diaphragm part 768 is relatively thin so that the diaphragm can deflect, and the plunger can move with very little force. This is important for long-term battery operation.

Referring to FIG. 7E, another embodiment of diaphragm membrane 764 can be made to include a forward slug cavity 772 (in addition to the rear plunger cavity shaped to accommodate the plunger tip). The forward slug cavity 772 is filled with a plastic or metal slug 774. The forward surface 770 including the surface of slug 774 is cooperatively arranged with the sealing surface of piloting button 705. Specifically, the sealing surface of piloting button 705 may include a pilot seat 709 made of a different material with properties designed with respect to slug 774. For example, high durometer pilot seat 709 can be made of a high durometer material. Therefore, during the sealing action, resilient and relatively hard slug 772 comes in contact with a relatively soft pilot seat 709. This novel arrangement of diaphragm membrane 764 and piloting button 705 provides for a long term, highly reproducible sealing action.

Diaphragm member 764 can be made by a two stage molding process where by the outer portion is molded of a softer material and the inner portion that is in contact with the pilot seat is molded of a harder elastomer or thermoplastic material using an over molding process. The forward facing insert 774 can be made of a hard injection molded plastic, such as acceptable copolymer or a formed metal disc of a non-corrosive non-magnetic material such as 300 series stainless steel. In this arrangement, pilot seat 709 is further modified such that it contains geometry to retain pilot seat geometry made of a relatively high durometer elastomer such as EPDM 0 durometer. By employing this design that transfers the sealing surface compliant member onto the valve seat of piloting button 705 (rather than diaphragm member 764), several key benefits are derived. Specifically, diaphragm member 764 a very compliant material. There are substantial improvements in the process related concerns of maintaining proper pilot seat geometry having no flow marks (that is a common phenomena requiring careful process controls and continual quality control vigilance). This design enables the use of an elastomeric member with a hardness that is optimized for the application.

Figure 7F:
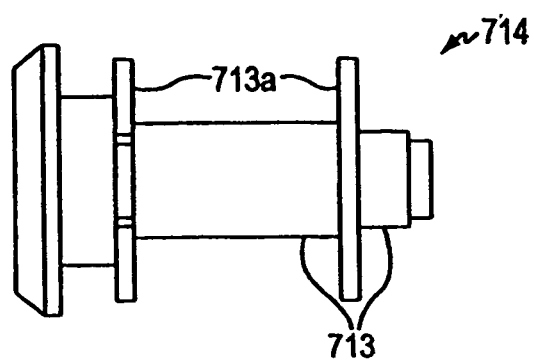
FIG. 7F is a sectional view of another embodiment of an armature bobbin used in the actuator shown in FIGS. 7 through 7C.

FIG. 7F is a cross-sectional view of another embodiment of an armature bobbin used in the actuator shown in FIGS. 7 through 7C. The bobbin's body is constructed to have low permeability to the armature fluid. For example, bobbin 714 includes metallic regions 713, which are in contact with the armature fluid, and plastic regions 713a, which are not in contact with the armature fluid.

According to another embodiment, the electronically controlled faucet is constructed and arranged to prevent bacterial or other contamination, especially bacterial growth in water remaining inside the faucet. The "antibacterial" faucet is mainly suitable for medical facilities such as operating rooms or emergency rooms. The "anti-bacterial" faucet includes mainly non-metallic conduits and valve elements in contact with water to substantially reduce or eliminate bacterial growth on their surfaces, and even act as inhibitors of bacterial growth. The "anti-bacterial" faucet also executes periodically a novel flushing algorithms.

Specifically, in the "antibacterial" faucet, metal conduits are made to have smooth bores (i.e., without surface crevices), or are replaced by plastic conduits. Suitable conduits and faucet elements are made of acetal copolymers that are known to be bacterial growth inhibitors (and some of them currently used in human implant applications). The above-described valve elements are made of similar materials including elastomeric members made of EPDM that has proven as an inhospitable media for micro organism growth. In addition to bio-compatible materials, the material surfaces may be coated or imbedded with suitable chemical agents for preventing or inhibiting bacterial or other growth.

In addition to bio-compatible materials, the "anti-bacterial" faucet executes various novel flushing algorithms that remove stagnate water residing inside the faucet. The flushing algorithms are designed to flush any potential bacterial growth, depending on the water temperature. The "anti-bacterial" faucet may include a temperature sensor providing temperature data to control circuitry, and thus correlating potential bacterial growth with the measured water temperature. Furthermore, the use of isolated actuator 143 reduces the amount of stagnate water located inside the control valves. Specifically, diaphragm membrane 764 prevents delivery of armature fluid from armature cavity to the faucet output port, while the piloting chamber (including region 708) is periodically flushed.

At predetermined flushing intervals, the control circuitry executes a flushing algorithm removing water from inside of the faucet including control valves.

The purging algorithm automatically turns on the water for a few seconds when a user is not present to remove standing water which resides in the faucet including the faucet's inlet and outlet conduit that is also exposed to air born pathogens. The periodicity of the purge cycle can be matched to the average growth of bacteria in tempered water with further the ability to alter the periodicity if the water temperature is higher (which increases growth rate). The periodicity control is achieved by means of user settable timings and/or the use of a temperature measurement element that is integrated into the control circuitry and in turn is used to determine automatically the needed purge rate.

Figure 8:
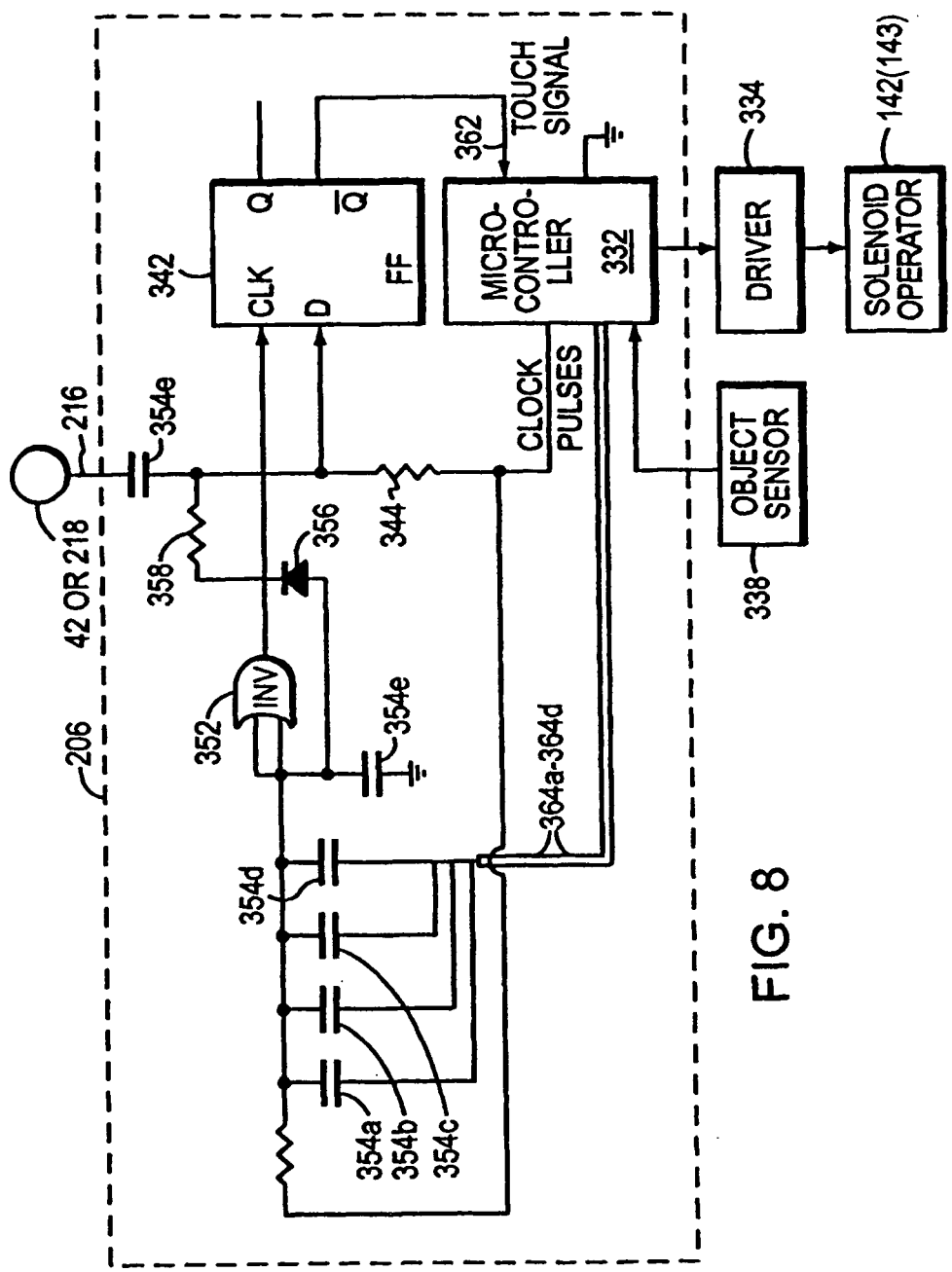
FIG. 8 is a block diagram showing a control circuitry for controlling operation of the faucet shown in FIG. 1 or FIG. 6

Referring to FIG. 8, a circuit/block diagram shows the major electrical components located on printed circuit board 206 which control the operation of faucet 10. A microcontroller 332 operates a driver 334 which powers the solenoid 142 of the valve assembly 96. In some faucet embodiments, the microcontroller 332 may also receive an input from an object sensor 336 which is part of a proximity transceiver 338 mounted to the faucet spout cover plate 326 just above opening 46 therein as shown in phantom in FIG. 1. Transceiver 338 may be of a known infrared type commonly found on automatic faucets and consisting of a light emitting diode which directs a beam of infrared light downward from the spout, and an infrared sensor which detects light reflected from a hand or other object positioned under the faucet spout.

The circuit diagram also includes a D-type flip-flop 342 whose D input receives pulses from microcontroller 332 by way of a resistor 344. That D input of the flip-flop is also connected via a capacitor 346 to the metal pad 218 comprising touch sensor 42. The Q output of a D-type flip-flop is the value that ifs D input had at the time of the last leading edge of a pulse train applied to the flip-flops' CLOCK (CLK) input terminal.

Normally, when a user has placed his hand or finger in the vicinity of the touch sensor 42, the Q output of flip-flop 342 remains asserted continuously. The microcontroller 332 produces a rectangular-wave clock signal which is applied via resistor 344 to the D input terminal of flip-flop 342. That same signal is applied to a resistor 348 and an inverter 352 to the CLK input terminal of flip-flop 342. However there is a delay in the transmission of that pulse from microcontroller 332 to the CLK input terminal of flip-flop 342 because of the presence of a plurality of capacitors 354a to 354e which capacitively load the input circuit of converter 352 as will be described in more detail below. The value at the D input port of flip-flop 342 therefore stabilizes at the higher level before the rising leading edge of the clock pulses from inverter 352 reach the flip-flop's CLK input terminal. Therefore, the Q output of the flip-flop is high. However this situation changes when a user's hand is very dose to the touch sensor 42 or actually touches it. This hand contact or proximity has the effect of capacitively loading the D input terminal of flip-flop 342; it may typically result in a capacitance on the order of 300 pF between sensor 42 and ground.

The inverter input is also connected via a diode 356 and a resistor 358 to the D input terminal of flip-flop 342. This imposes a delay at the D input 342 of flip flop affecting the pulse level to the extent that the edge of the dock signal applied to the clock input of the flip-flop now occurs before the D input has reached the high level. Therefore, the flip-flip's Q output remains low. The microcontroller receives the compliment of that Q output at its input 362 and thereby infers that a user has touched the sensor 42.

However, various environmental factors can also load the touch sensor 42. Therefore, in a preferred embodiment of the invention, the microcontroller 332 so adjusts the circuit's sensitivity as to minimize the likelihood of erroneous human-contact indications. As does this by employing lines 364a to 364d to ground selected one of the capacitors 354a to 354d, while allowing the others to float. By selectively grounding these capacitors, the microcontroller can choose among 16 different sensitivity levels. This sensitivity adjustment is done dynamically to account for changing environmental conditions or a user's nervousness or hesitancy for being considered as multiple inputs to the faucet's touch sensing circuitry. The microcontroller 332 monitors the output of flip-flop 342 and changes the sensitivity level of the sensing circuit according to an adapting or dynamic sensing algorithm to be discussed in connection with FIG. 8A.

The microcontroller 332 operates, as many battery-operated do, in a sleep/wake sequence. Most of the time, the controller is "asleep": it receives only enough power to maintain the state of certain volatile registers, but it is not being docked or executing instructions. This sleep state is interrupted periodically, say, every 120 ms, with a "wake" state, in which it executes various subroutines before returning to its sleep state. The duration of the wake state is typically a very small fraction of the controller's sleep state duration.

Figure 8A:
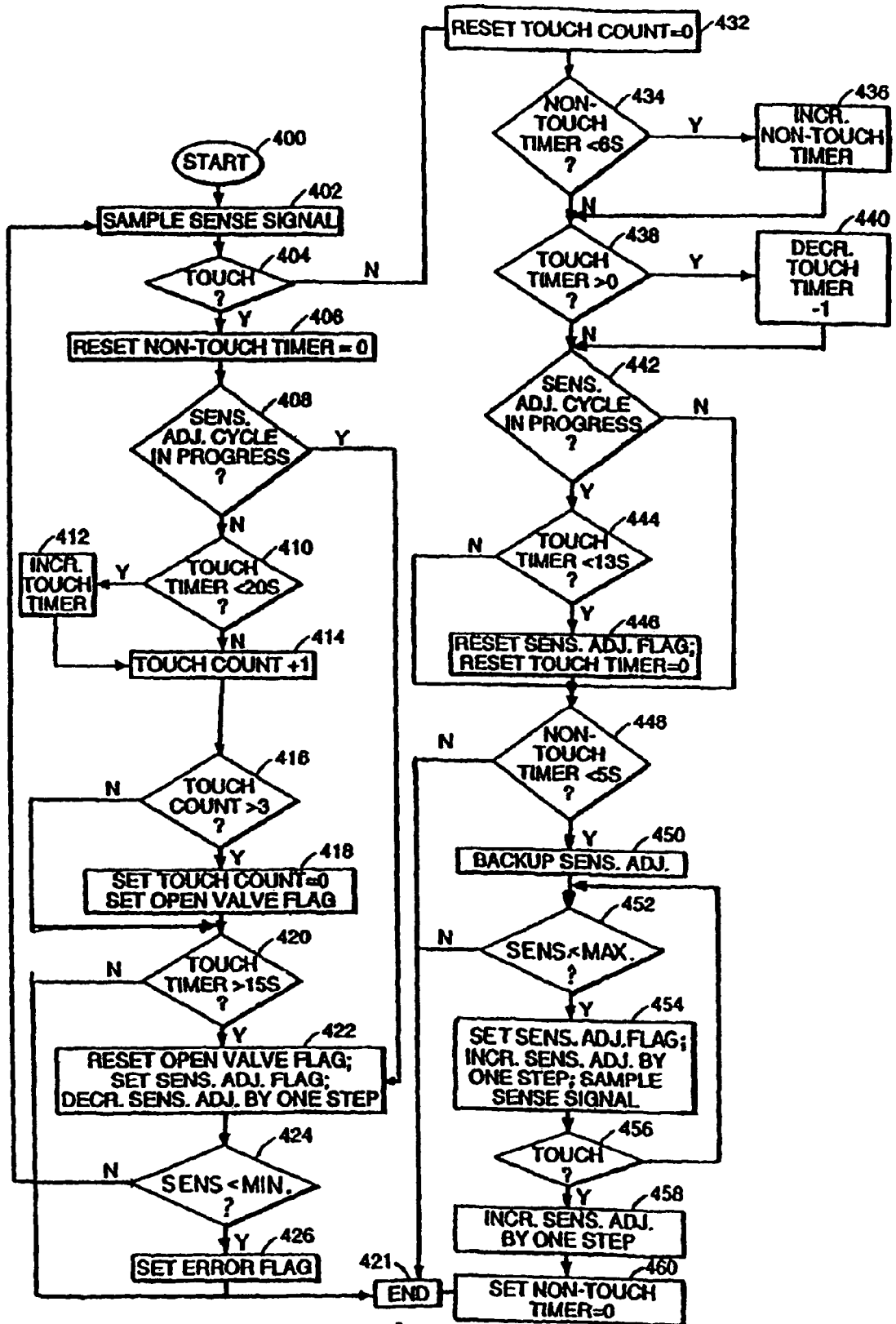
FIG. 8A is a flow chart of an algorithm performed by a microcontroller used in the control circuitry.

One of the routines performed by microcontroller 332 when it awakens is the sensitivity adjustment routine depicted in the FIG. 8A flow chart. In FIG. 8A, block 400 represents the start of that routine and block 402 represents sampling the value of the signal applied to the microcontroller sense input 362 shown in FIG. 8. If because of the operation just described, that input's level indicates that a user is touching the touch sensor 42, the controller sets to zero a non-touch timer representing how long it has been since the faucet detected a person's touch at touch sensor 42. Blocks 404 and 406 represent this subroutine. As will be explained presently, the non-touch timer is used to determine when to make a sensitivity adjustment.

Although a touch detection is usually the basis for causing the faucet valve to open, the system is sometimes in a mode in which it is used instead to determine when to adjust sensitivity. Block 408 represents reading a flag to determine whether a sensitivity adjustment or a touch cycle is currently in progress. If it is not, the routine proceeds to increment a touch timer if that timer has not already reached a maximum value. Blocks 410 and 412 represent that incrementing operation.

The touch timer indicates how long a touch detection has been reported more or less continuously. An excessive touch duration will cause the system to infer that the touch detection resulted from something other than a human user and that the system's sensitivity should therefore be reduced to avoid such erroneous detections. Before the system test that duration for that purpose, however, it first performs a de-bounce operation, represented by blocks 414 and 416, in which it determines whether the number of successive touch detections exceeds three. If it has, then at block 418, the system resets the touch count to zero and sets a flag that will tell other routines, not discussed here, to open the valve. If these three detections have not occurred in a row, on the other hand, the system does not yet consider the touch valid and that flag is not set.

The system then performs a test, represented by block 420 to determine whether it should reduce the system's sensitivity. If the touch timer represents a duration less than 15 seconds, the routine simply ends at block 421. Otherwise, it resets the flag that would otherwise cause other routines to open the valve. It also sets a flag to indicate that the system is in its sensitivity or adjustment mode and causes a decrease in sensitivity by one step. That is, it so changes the combination of capacitors 354a to 354e in the circuit of FIG. 8 that are connected to ground that the signal applied to the CLK input of flip-flop 342 is increased. Resultantly, a greater loading of the touch sensor 42 will be required for the flip-flop 342 to indicate that a touch has occurred. Block 422 represents taking those actions.

It may occur in some situations that the sensitivity was already as low as it could go. If that happens, the system is in an error condition, and subsequent circuitry should take appropriate action. This is determined at block 424. If it has, then the routine sets an error flag as indicated at block 426 and the routine ends at block 421. If the system is not in that error condition, the routine performs the steps at blocks 406 and 408 as before. This time, however, the sensitivity-adjustment flag is set so that the test at block 408 results in the routines jumping to the step at block 422 to repeat the sensitivity-reduction sequence just described.

Referring to the right hand side of FIG. 8A, if the block 404 step yields an indication that no touch has been detected by the touch sensor 42, the routine resets the touch counter to zero as indicated at block 432.

As was described previously, an extended period of touch detection will cause the system to reduce its sensitivity, on the theory that detection for so long a period could not have been the result of a legitimate human contact. If contact absence has been indicated for an extended period, on the other hand, it is logical to conclude that the current capacitive loading provided by capacitors 354a to 354e (FIG. 8) is consistent with contact absence but that any greater capacitance is likely to be an indication of legitimate contact of the touch sensor 42. The system therefore responds to an extended period of detection absence by increasing the sensitivity to a value just below one that would cause touch detection with the currently prevailing capacitance loading by capacitors 354a to 354e (FIG. 8).

To this end, the routine in FIG. 8A increments the non-touch timer if that timer has not exceeded a selective maximum value, e.g. 6 seconds. Blocks 434 and 436 represent that operation. Since this point in the routine is reached as a result of the indication of block 404 that no touch has been detected, it would seem logical to reset the touch timer to zero. However, to make the illustrated system more robust to noise that could cause a non-contact indication to occur momentarily in the midst of an extending contact, the illustrated arrangement instead merely decrements the touch timer towards zero if it has not yet reached that value. Blocks 438 and 440 represent the decrementing of that timer.

Now if such touch-timer decrementing has occurred enough times for that timer's value to have been reduced by a selected value, say, two seconds, the system can rule out the possibility that the lack of touch detection was simply caused by noise. Therefore, since the system has assumed the sensitivity-adjustment mode as a result of that timer having reached 15 seconds, its count having been decremented to 13 seconds, can be considered as an indication that contact with the touch sensor 42 has actually ended. The touch timer is therefore set to zero and the system leaves the sensitivity-adjustment mode as indicated by blocks 442, 444 and 446.

At block 448, the routine then tests the non-touch timer to determine whether the absence of touch detection has lasted long enough to justify trying a sensitivity increase. If not, the routine ends at block 421. Otherwise, the routine makes a back-up-copy of the current sensitivity at block 450 and then proceeds to determine whether an increase in sensitivity will cause a touch detection. Of course, the sensitivity cannot be increased if it is already at its maximum value so at block 452, the routine goes to END block 421. However if the sensitivity is not yet at its maximum value, it is increased by one step as indicated at block 458. This is part of the sensitivity-adjustment so that that step includes setting the sensitivity-adjustment mode flag. The microcontroller 332 (FIG. 8) then samples the output of flip-flop 342 again, as indicated at block 454 and, as block 456 indicates branches on the result. In particular, if a sensitivity increase has not resulted in an apparent touch detection, then the sensitivity is increased again (because it has not reached a maximum), and the output of flip-flop 342 is sensed again.

This continues until an apparent touch is detected. Since the sensitivity adjustment scheme is based on the assumption that there really is no valid contact at touch sensor 42, the sensitivity is thus reduced back by one step so that it is at the highest level that yields no touch indication. Block 458 represents this operation.

Now that a sensitivity-adjustment has been made, the non-touch timer is reset to zero as indicate at block 460 so that the sensitivity will not be reset again on the next controller wake cycle. The routine then ends at block 421.

Figure 9:
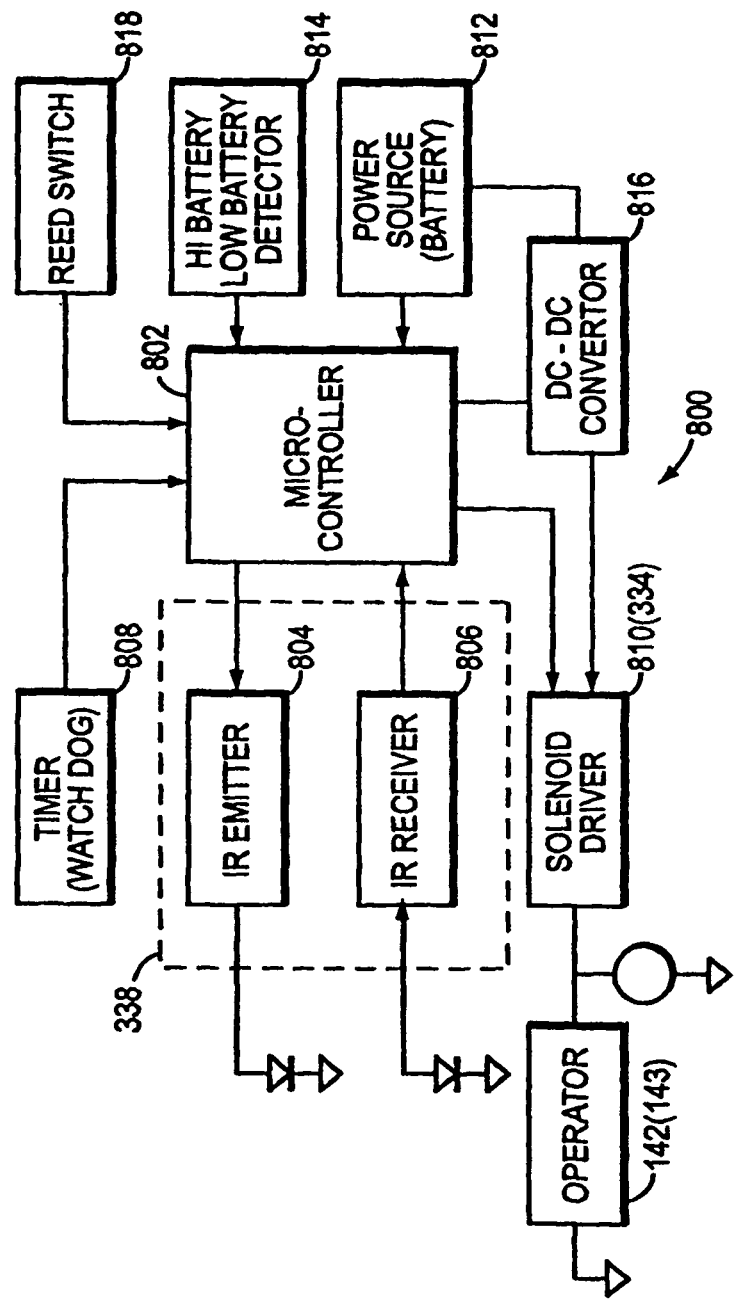
FIG. 9 is a block diagram of another embodiment of control circuitry for controlling operation of the faucet shown in FIG. 1 or FIG. 6

FIG. 9 is a block diagram of another embodiment of control circuitry 800 used for operating electronic faucets shown in FIGS. 1 and 6. Control circuitry 800 includes a microcontroller 802 designed to communicate with an IR emitter 804 and an IR receiver 806, forming optical transceiver 338 used in the faucets. Microcontroller 802 also receives "wake-up" signals from a timer (i.e., watchdog) 802, for example, every 250 msec. The entire circuitry is powered by a battery power source 812, and also includes a battery detector 813. After receiving appropriate control signals from optical transceiver 338, microcontroller 802 sends an actuation signal to a solenoid driver 810, which in turn provides a coil drive signal (latch or unlatch current) to the coil 728 of operator 142 or 143. Then microcontroller 802 goes to a "sleep" mode.

Microcontroller 802 is programmed to operate the entire circuit 800 while conserving battery power using a sleep mode. Microcontroller 802 receives a reset signal from a timer 808 every, for example, 250 msec, and then wakes up and performs a detection cycle. Timer 808 may be RC circuit based or crystal oscillator based, which may be internal to the microcontroller Microcontroller 802 provides current to IR emitter 804 that emits an IR beam and receives signal from IR detector 806, as known in the art. The operation of the optical transceiver 338 is described in U.S. Pat. No. 5,979,500 or U.S. Pat. No. 5,984,262, and is also described in co-pending U.S. application Ser. Nos. 10/012,252 and 10/012,226, all of which are incorporated by reference. Microcontroller 802 may be microcontroller COP8SAB and COP8SAC made by National Semiconductor, or microcontroller IMP86c807M made by Toshiba. To save power and significantly extend battery operation, the wake-up period is much shorted than the sleep period. Depending on the controllers mode, the sleep time may be 100 msec, 300 msec, or 1 sec.

Microcontroller 802 provides current to IR emitter 804 that emits an IR beam and receives signal from IR detector 806, both of which are set initially the detection distance of 7.5 inches. That is, initially the sensitivity of object detection (e.g., user's hands) is set for 7.5 inches, but this can be altered in an autocalibration cycle automatically performed by microcontroller 802.

The electronic faucet can communicate with a user by a novel "burst interface" that provides signals to a user in form of water bursts emitted from the faucet. Alternatively, the electronic faucet may include novel an optical or acoustic interface. The electronic faucet is designed to prevent wasting of water when for example an object permanently located in a sink.

Microcontroller 802 is programmed to automatically go to various modes depending on the state of optical transceiver 338, battery detector 814, or any other element. For example, microcontroller 802 is designed to go automatically into a self-calibration mode after detecting an object for a preset duration (for example, 15 or 20 seconds). If transceiver 338 senses an object located in a sink at a distance of 7.5 inches for 15 seconds, microcontroller 802 directs emission of two water pulses (to signal to a user) and starts a self calibration routine that determines a new detection distance. In this routine, transceiver 338 detects the distance to the "permanently" located object and set up a new background values for IR emitter or IR detector. Then, microcontroller 802 directs driver 810 to emit three short bursts of water to signal the end of the self calibration mode. After executing the self calibration, the "permanently" located object is "seen" as background and thus doesn't trigger valve opening.

A user can initiate the self calibration mode by placing an object in front of, transceiver 338, and then after two bursts at a selected distance that the system will determine as a new background distance. A user can initiate also other modes, by for example covering optical transceiver 338.

What is claimed is:
1. An electronic faucet comprising
   a housing;
   at least one water inlet line extending into the housing;
   a water outlet from the housing, said housing including removable cover parts;

a valve cartridge located inside said housing, said valve cartridge including a solenoid valve and a diaphragm for controlling the water flow between said at least one inlet line and the outlet;
a battery located inside said housing;
an object sensor, located inside said housing, for detecting a faucet user; and
a control circuit, located inside said housing, for controlling the opening and closing of the solenoid valve, the control circuit including a microcontroller, receiving signals from the object sensor, for controlling operation of the electronic faucet and controlling a solenoid driver receiving battery power from a DC-to-DC converter, the solenoid driver providing power to the solenoid valve, said microcontroller controlling the operation by utilizing timers measuring detection and non-detection of the faucet user by the object sensor.

2. The electronic faucet of claim 1, wherein said solenoid valve includes a latching actuator.

3. The electronic faucet of claim 1, wherein said solenoid valve includes a non-latching actuator.

4. The electronic faucet of claim 1, wherein said solenoid valve includes an actuator having an isolation membrane for containing fluid inside a plunger cavity of said actuator.

5. The electronic faucet of claim 1, wherein said valve cartridge includes a filter member in the flow path between said at least one inlet line and the outlet.

6. The electronic faucet of claim 1, including a faucet head removably mounted to the housing and being associated with the object sensor.

7. The electronic faucet of claim 1, further including a check valve releasably retained in each inlet line.

8. The electronic faucet of claim 1, wherein the housing includes a spout portion having a removable cover plate and enclosing a spout having a first end connected to said water outlet.

9. The electronic faucet of claim 1, wherein said microcontroller utilizes one of said timers for controlling open time when water is flowing from the water outlet.

10. An electronic faucet mounted on a countertop, comprising
a housing including a mixing valve, a solenoid valve, a battery for providing power, and an object sensor all being located inside the housing;
a cold water inlet line and a hot water inlet line both extending into said housing and providing water to said mixing valve, said mixing valve adjusting a ratio of cold and hot water;
a water outlet for providing water mixed in said mixing valve; and
a control circuit including a microcontroller communicating with the object sensor and a solenoid driver receiving battery power and initiating the solenoid valve, said control circuit being constructed to adjust dynamically activation sensitivity of said object sensor to prevent erroneous detection of a faucet user, said microcontroller executing a self calibration routine for said object sensor.

11. The electronic faucet of claim 10 including a timer for controlling open time when water is flowing from the water outlet.

12. The electronic faucet of claim 10 including a DC-to-DC converter receiving battery power and providing signals to said microcontroller controlling said solenoid driver for opening and closing said solenoid valve.

13. The electronic faucet of claim 10 wherein said object sensor is a capacitive sensor.

14. The electronic faucet of claim 13, wherein the control circuit includes grounded and floating capacitors and a flip-flop circuit constructed to select different sensitivity levels of the capacitive sensor.

15. The electronic faucet of claim 10 including a faucet head removably mounted to the housing.

16. The electronic faucet of claim 10, wherein said battery is located inside a battery holder being accessible by removing a portion of the faucet housing.

17. An electronic faucet, comprising
a housing;
at least one water inlet line extending into the housing;
a water outlet from the housing;
an object sensor for detecting a faucet user;
a solenoid valve for controlling the water flow between said at least one inlet line and the outlet;
a battery; and
a control circuit including a microcontroller communicating with the object sensor, and a solenoid driver receiving battery power and initiating the solenoid valve, said control circuit being constructed to adjust dynamically activation sensitivity, at different sensitivity levels to prevent erroneous detection of the faucet user, said microcontroller executing a self calibration routine for said object sensor.

18. The electronic faucet of claim 17, wherein said housing is mounted on a countertop and said faucet includes a mixing valve located below said countertop and constructed to adjust ratio of cold and hot water.

19. The electronic faucet of claim 17, wherein said solenoid valve is located below a countertop.

20. The electronic faucet of claim 17 including a timer for controlling open time water when is flowing from the water outlet.

21. The electronic faucet of claim 17 including a DC-to-DC converter receiving battery power and providing signals to said microcontroller controlling said solenoid driver for opening and closing said solenoid valve.

22. The electronic faucet of claim 17 wherein said object sensor is a capacitive sensor.

23. The electronic faucet of claim 22, wherein the control circuit includes grounded and floating capacitors and a flip-flop circuit constructed to select said sensitivity levels of the capacitive sensor.

24. The electronic faucet of claim 17 including a faucet head removably mounted to the housing.

25. The electronic faucet of claim 23, wherein the flip-flop circuit includes a D-type flip-flop.

* * * * *